United States Patent
Otomo et al.

(10) Patent No.: US 9,529,073 B2
(45) Date of Patent: Dec. 27, 2016

(54) DETERMINING METHOD, COMPUTER PRODUCT, DETERMINING APPARATUS, AND DETERMINING SYSTEM

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Yokohama (JP); Hiromasa Yamauchi, Usakos (NA); Koji Kurihara, Kawasaki (JP); Yuta Teranishi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 14/619,879

(22) Filed: Feb. 11, 2015

(65) Prior Publication Data
US 2015/0153439 A1    Jun. 4, 2015

Related U.S. Application Data

(63) Continuation of application No. PCT/JP2012/071230, filed on Aug. 22, 2012.

(51) Int. Cl.
*H04W 4/02* (2009.01)
*G01S 5/02* (2010.01)
(Continued)

(52) U.S. Cl.
CPC ............... *G01S 5/02* (2013.01); *G01S 5/0226* (2013.01); *G01S 11/02* (2013.01); *H04W 4/025* (2013.01);
(Continued)

(58) Field of Classification Search
CPC ........ H04W 64/00; H04W 4/02; H04W 8/245; H04W 1/72519
(Continued)

(56) References Cited

U.S. PATENT DOCUMENTS

| 8,320,933 B2 * | 11/2012 | Bhattacharya | H04W 64/00 370/331 |
| 8,805,404 B1 * | 8/2014 | Yang | H04W 4/02 455/456.1 |

(Continued)

FOREIGN PATENT DOCUMENTS

| JP | 2006-229845 | 8/2006 |
| JP | 2007-221541 | 8/2007 |
| JP | 2010-213278 | 9/2010 |

OTHER PUBLICATIONS

Extended European Search Report dated Dec. 2, 2015 in corresponding European Patent Application No. 12883109.6.

(Continued)

*Primary Examiner* — Danh Le
(74) *Attorney, Agent, or Firm* — Staas & Halsey LLP

(57) ABSTRACT

A determining method executed by a processor includes obtaining distance information that indicates a distance between monitoring apparatuses disposed to encompass a given area in which wireless communications apparatuses are scattered; causing a wireless signal to be transmitted and received between the monitoring apparatuses by multi-hop communication among the wireless communications apparatuses; calculating an estimated distance between the monitoring apparatuses, based on a hop count of the wireless signal multi-hop communicated among the monitoring apparatuses; and making a determination concerning a vacant area in which none of the wireless communications apparatuses is present, based on a result of comparison of the distance indicated by the obtained distance information and the calculated estimated distance.

14 Claims, 13 Drawing Sheets

(51) Int. Cl.
  *G01S 11/02*  (2010.01)
  *H04W 84/18*  (2009.01)
  *H04L 12/733* (2013.01)
  *H04W 40/20*  (2009.01)

(52) U.S. Cl.
  CPC .............. *H04W 84/18* (2013.01); *H04L 45/20* (2013.01); *H04W 40/20* (2013.01)

(58) Field of Classification Search
  USPC .................. 455/456.1, 456.5, 418, 550.1
  See application file for complete search history.

(56) References Cited

U.S. PATENT DOCUMENTS

| | | | | |
|---|---|---|---|---|
| 9,245,241 | B2* | 1/2016 | Kite | G06Q 10/06 |
| 2005/0233748 | A1* | 10/2005 | Robinson | G01S 5/0289 |
| | | | | 455/440 |
| 2006/0195815 | A1* | 8/2006 | Ogino | B82Y 10/00 |
| | | | | 716/53 |
| 2008/0204321 | A1* | 8/2008 | Yanagihara | G01S 5/0284 |
| | | | | 342/450 |
| 2009/0167513 | A1* | 7/2009 | Hill | G01S 5/0072 |
| | | | | 340/435 |
| 2010/0231357 | A1 | 9/2010 | Hong et al. | |
| 2011/0282714 | A1* | 11/2011 | Cullen, III | G06Q 10/06 |
| | | | | 705/7.38 |
| 2013/0141283 | A1* | 6/2013 | Galov | G01S 5/08 |
| | | | | 342/464 |
| 2015/0120555 | A1* | 4/2015 | Jung | G06Q 20/40 |
| | | | | 705/44 |
| 2015/0358768 | A1* | 12/2015 | Luna | H04W 4/02 |
| | | | | 455/456.1 |

OTHER PUBLICATIONS

Funke, "Topological Hole Detection in Wireless Sensor Networks and its Applications", DIALM-POMC'05, Sep. 2, 2005, Cologne, Germany, pp. 44-53.
Peng et al., "Fast Release/Capture Sampling in Large-Scale Sensor Networks", IEEE Transactions on Mobile Computing, vol. 11, No. 8, Aug. 2012, pp. 1274-1286.
Chen et al., "A Survey of Void Handling Techniques for Geographic Routing in Wireless Networks", IEEE Communications Surveys and Tutorials, 1$^{st}$ Quarter 2007, vol. 9, No. 1, pp. 50-67.
International Search Report mailed Sep. 18, 2012 in corresponding international application PCT/JP2012/071230.
Yue Wang et al. "Boundary Recognition in Sensor Networks by Topological Methods", MobiCom '06 Proceedings of the 12th annual international conference on Mobile computing and networking, Sep. 26, 2006, p. 122-p. 133.
Robert Ghrist et al. "Coverage and Hole-Detection in Sensor Networks Via Homology", Information Processing in Sensor Networks, 2005. IPSN 2005. Fourth International Symposium, Apr. 27, 2005, p. 254-p. 260.
Kun Bi et al. "Neighborhood-Based Distributed Topological Hole Detection Algorithm in Sensor Networks", Wireless, Mobile and Multimedia Networks, 2006 IET International Conference, Nov. 9, 2006, p. 1-p. 4.
S. Vural et al. "On Multihop Distances in Wireless Sensor Networks with Random Node Locations", Mobile Computing, IEEE Transactions on , Apr. 2010, 3.3 Analysis of Single hop Maximum Distance.
Liang Zhao et al. "Modeling End-to-end Distance for Given Number of Hops in Dense Planar Wireless Sensor Networks", Sensor and AdHoc Communications and Networks, 2006. SECON '06. 2006 3rd Annual IEEE Communications Society, Sep. 28, 2006, p. 751-p. 755.

* cited by examiner

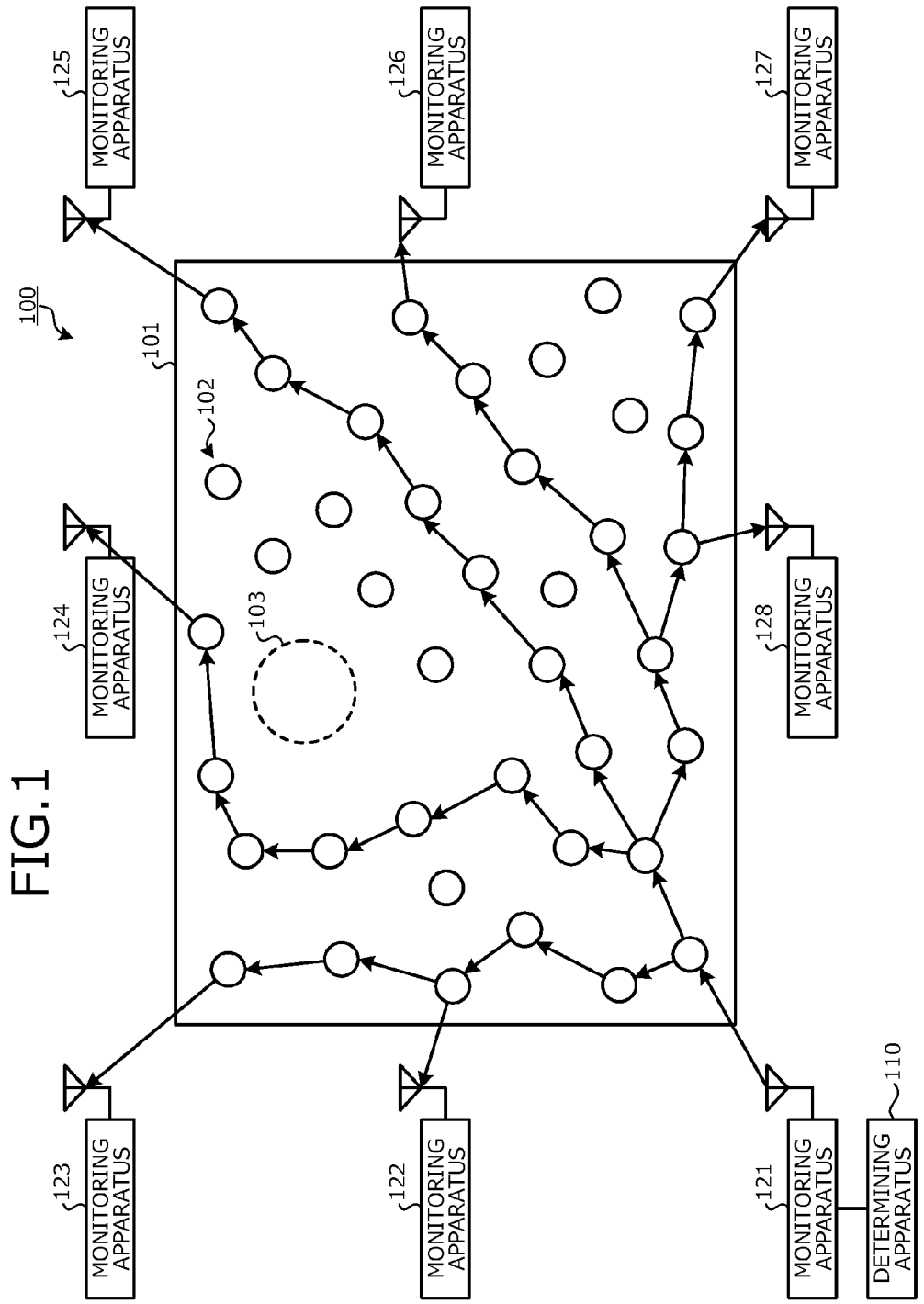

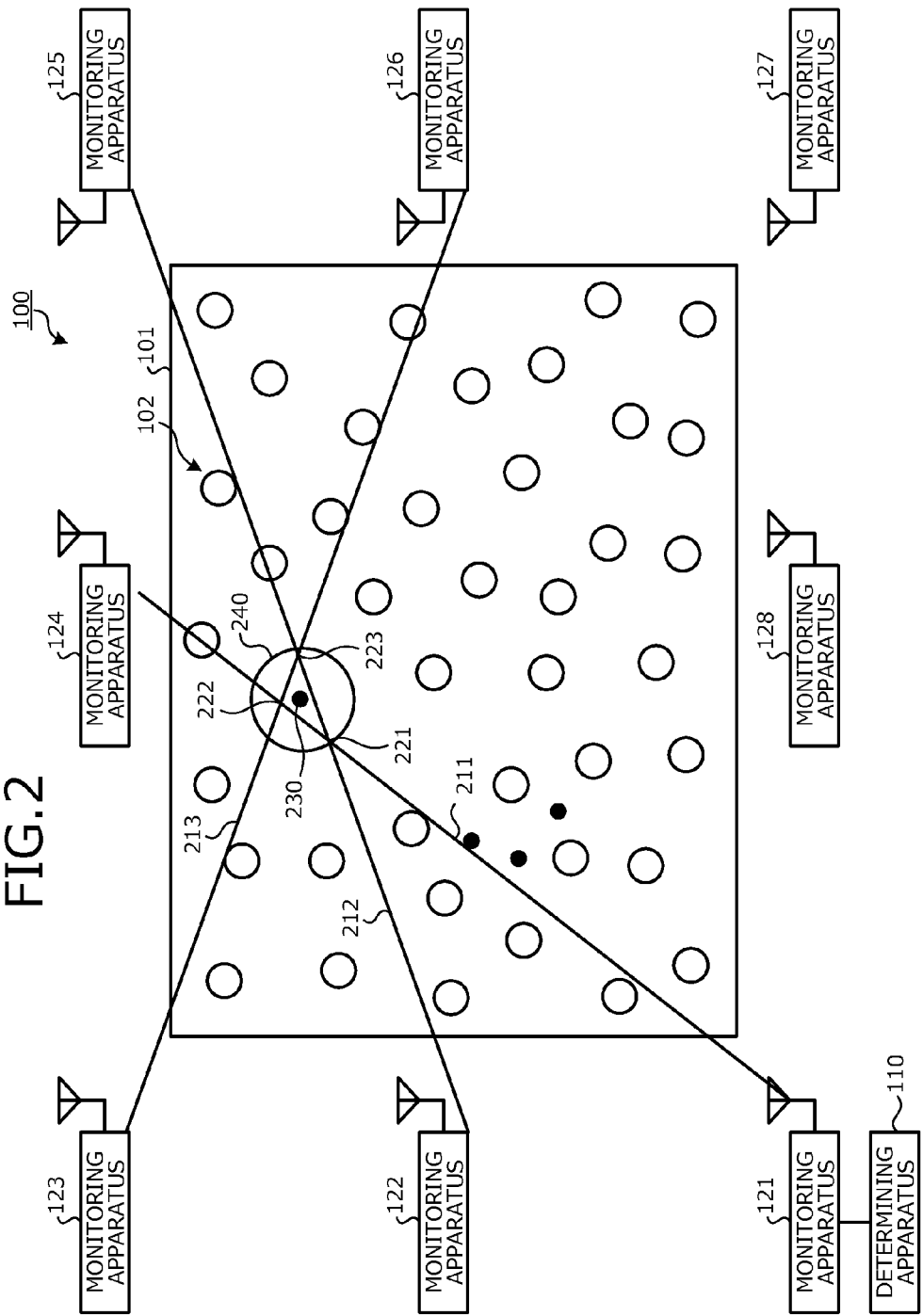

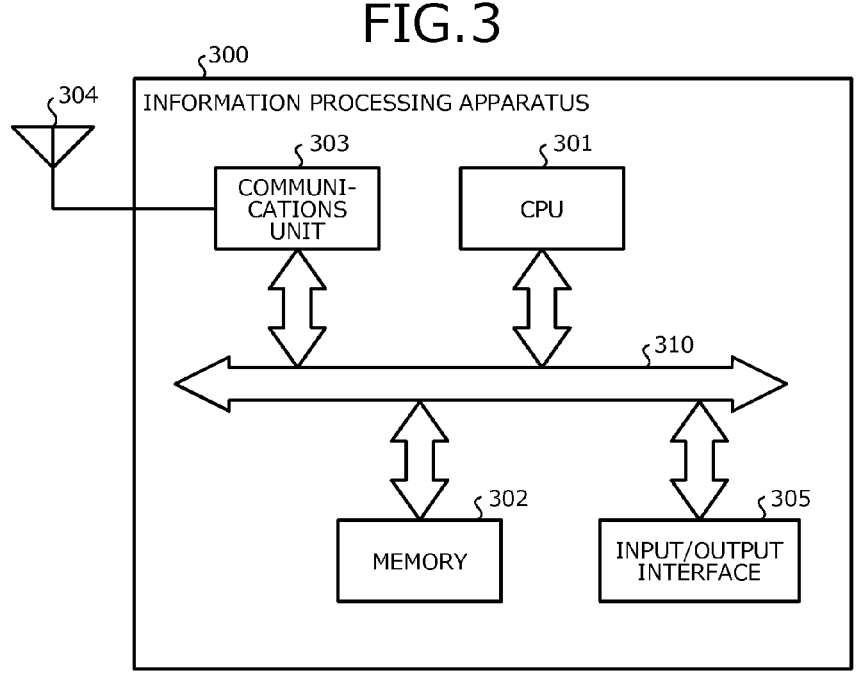
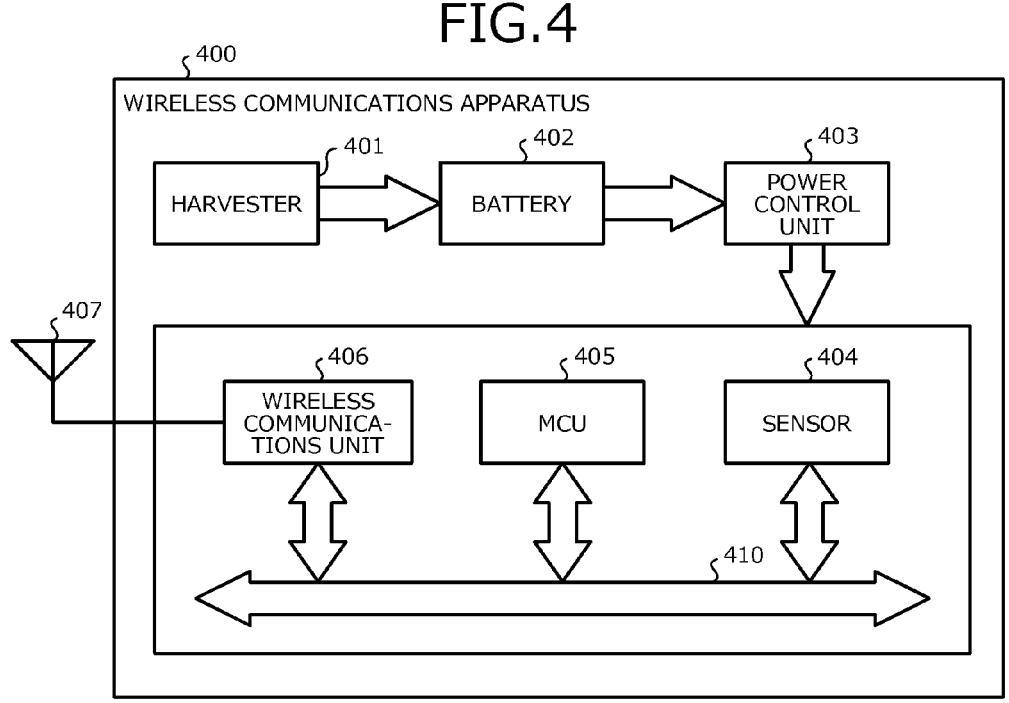

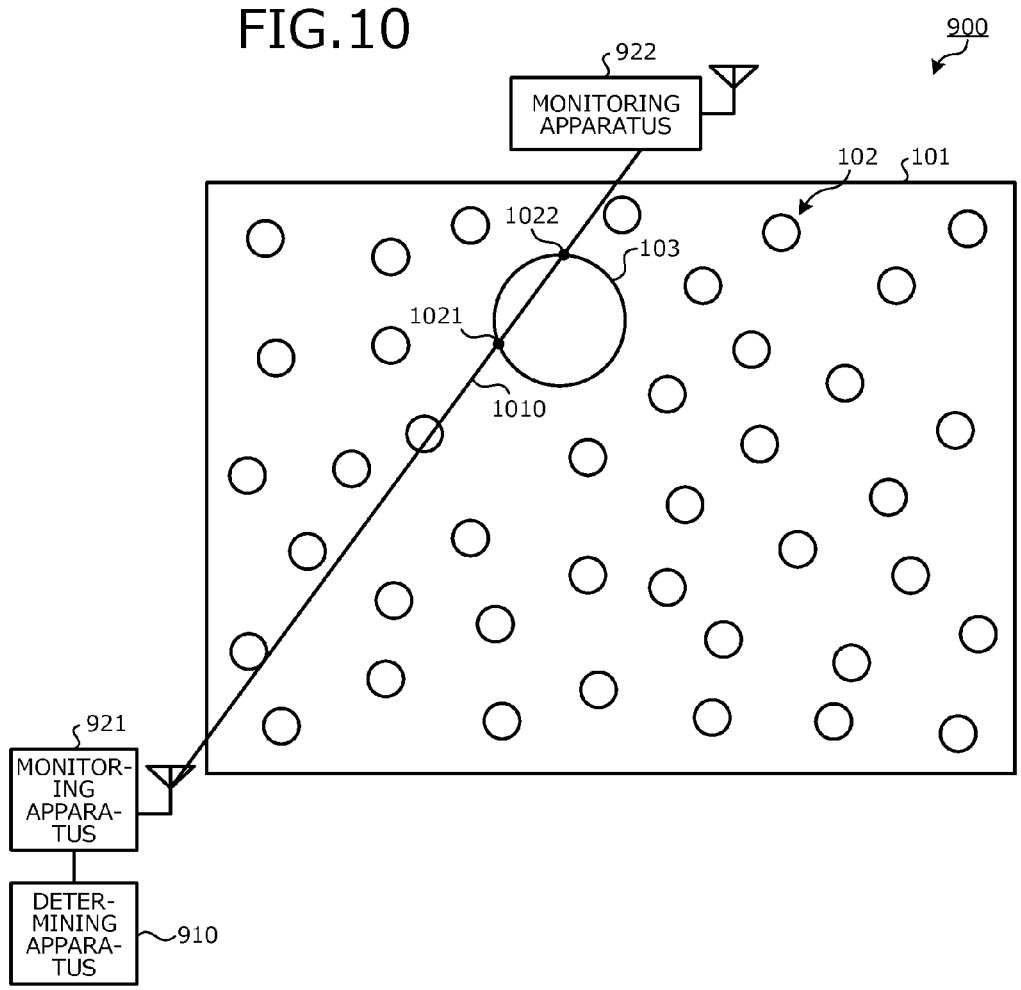

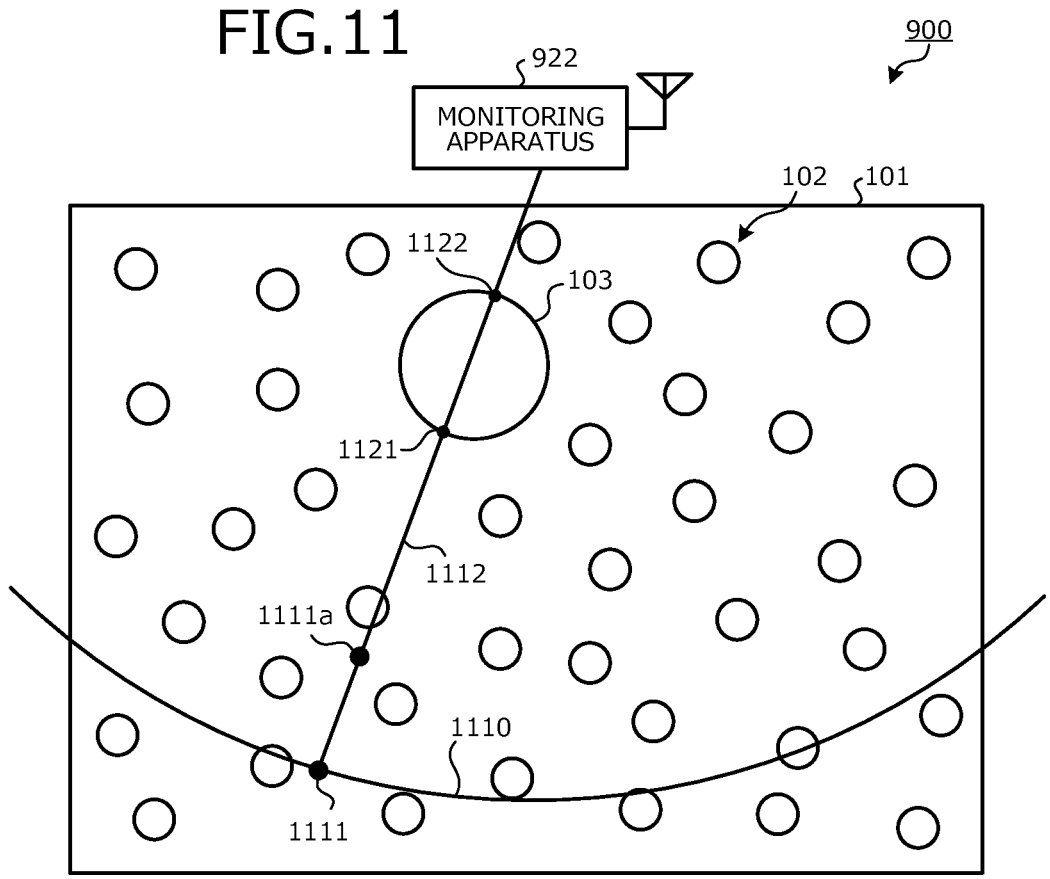

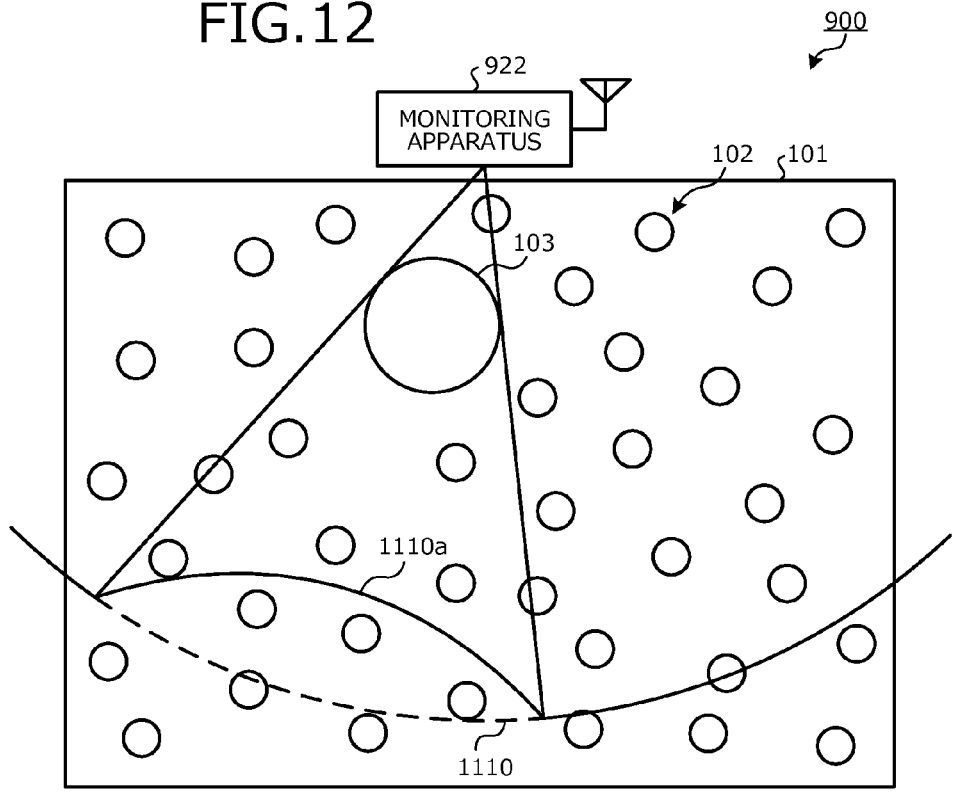
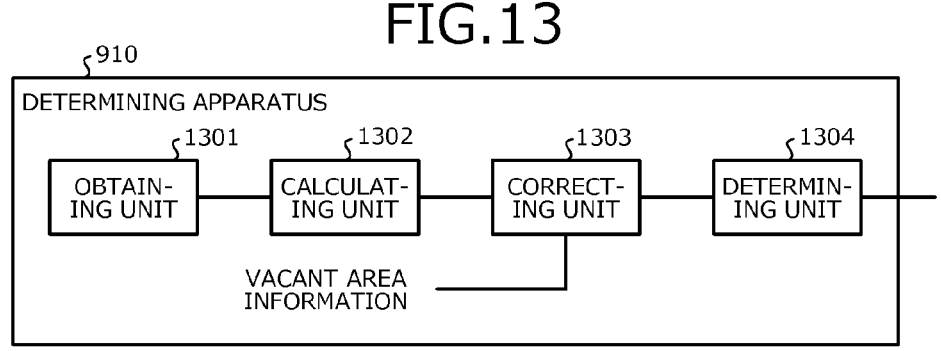

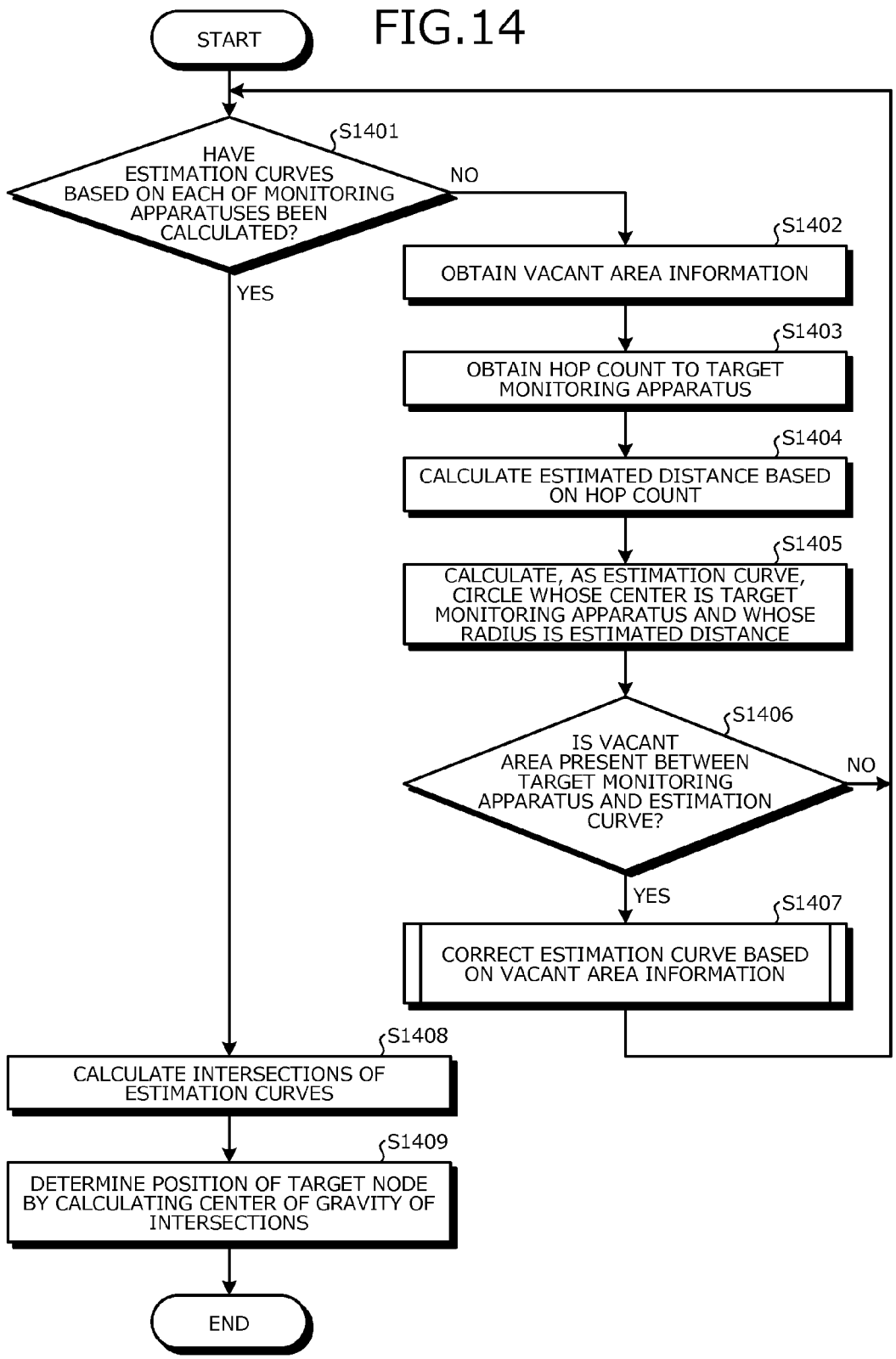

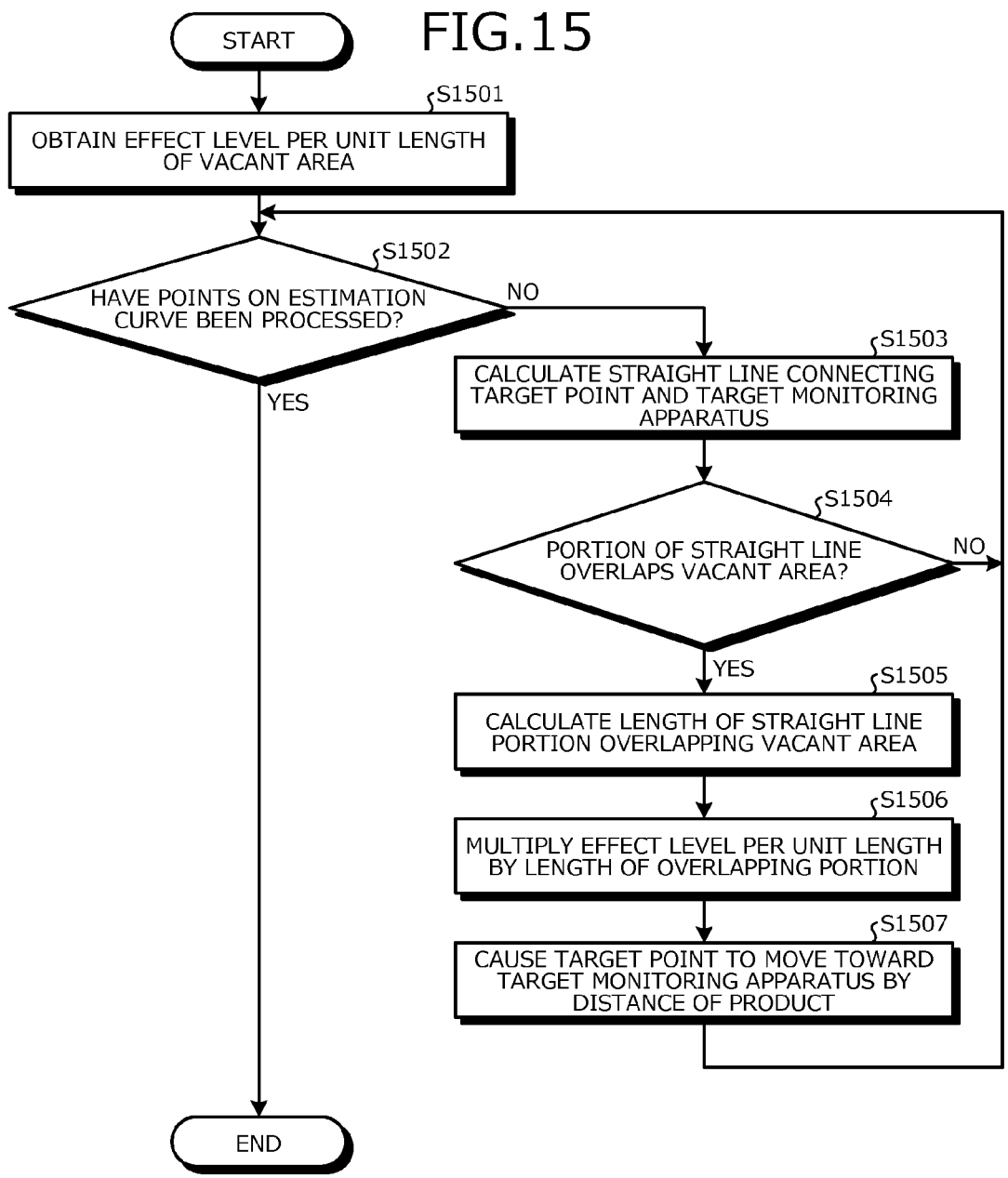

DETERMINING METHOD, COMPUTER PRODUCT, DETERMINING APPARATUS, AND DETERMINING SYSTEM

CROSS REFERENCE TO RELATED APPLICATIONS

This application is a continuation application of International Application PCT/JP2012/071230, filed on Aug. 22, 2012 and designating the U.S., the entire contents of which are incorporated herein by reference.

FIELD

The embodiments discussed herein are related to a determining method, a determining program, a determining apparatus, and a determining system.

BACKGROUND

A technique of using multiple receiving apparatuses and multiple wireless terminals to determine the position of a wireless terminal is known (for example, refer to Japanese Laid-Open Patent Publication No. 2007-221541). Further, a radio frequency identification (RFID) system that uses multiple monitoring apparatuses and multiple nodes (wireless sensor, etc.) is known (for example, refer to Japanese Laid-Open Patent Publication No. 2010-213278).

According to another known technique, in an ad hoc network, the distances between a mobile terminal apparatus and multiple base stations are estimated based on the hop counts from the mobile terminal apparatus to the base stations, and based on a result of the estimation, the position of mobile terminal apparatus is estimated (for example, refer to Japanese Laid-Open Patent Publication No. 2006-229845). Further, a known sensor network (wireless sensor network) is a wireless network in which multiple wireless terminals equipped with sensors are scattered and the wireless terminals cooperate to obtain an environment or a physical state.

SUMMARY

According to an aspect of an embodiment, a determining method executed by a processor includes obtaining distance information that indicates a distance between monitoring apparatuses disposed to encompass a given area in which wireless communications apparatuses are scattered; causing a wireless signal to be transmitted and received between the monitoring apparatuses by multi-hop communication among the wireless communications apparatuses; calculating an estimated distance between the monitoring apparatuses, based on a hop count of the wireless signal multi-hop communicated among the monitoring apparatuses; and making a determination concerning a vacant area in which none of the wireless communications apparatuses is present, based on a result of comparison of the distance indicated by the obtained distance information and the calculated estimated distance.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram (part 1) depicting an example of determination by a determining system according to a first embodiment;

FIG. 2 is a diagram (part 2) depicting an example of determination by the determining system according to the first embodiment;

FIG. 3 is a diagram depicting an example of a hardware configuration of a determining apparatus and monitoring apparatuses;

FIG. 4 is a diagram depicting an example of a hardware configuration of a node;

FIG. 10 is a diagram (part 1) depicting an example of estimation curve correction by the determining system;

FIG. 11 is a diagram (part 2) depicting an example of estimation curve correction by the determining system;

FIG. 12 is a diagram (part 3) depicting an example of estimation curve correction by the determining system;

FIG. 13 is a diagram depicting an example of a configuration of the determining apparatus according to the second embodiment;

FIG. 14 is a flowchart depicting an example of determination operation of the determining apparatus according to the second embodiment; and FIG. 15 is a flowchart depicting an example of correction operation of the determining apparatus according to the second embodiment.

DESCRIPTION OF EMBODIMENTS

Figure 5:
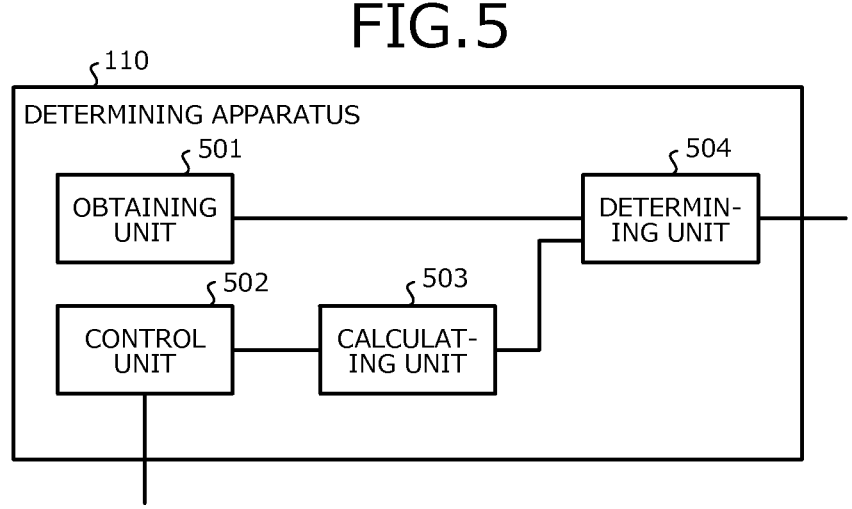
FIG. 5 is a diagram depicting an example of a configuration of the determining apparatus according to the first embodiment.

Embodiments of a determining method, a determining program, a determining apparatus, and a determining system will be described in detail with reference to the accompanying drawings.

FIG. 1 is a diagram (part 1) depicting an example of determination by a determining system according to the first embodiment. As depicted in FIG. 1, a determining system 100 according to the first embodiment includes a determining apparatus 110 and monitoring apparatuses 121 to 128.

The determining apparatus 110 is an apparatus that can communicate with the monitoring apparatuses 121 to 128. Further, the determining apparatus 110 may be an apparatus that is provided separately from the monitoring apparatuses 121 to 128, or may be an apparatus that is provided in any one of the monitoring apparatuses 121 to 128. In the example depicted in FIG. 1, the determining apparatus 110 is provided in the monitoring apparatus 121.

The monitoring apparatuses 121 to 128 are arranged to encompass a given area 101. The monitoring apparatuses 121 to 128 monitor a signal transferred by multi-hop communication in a node group 102. Multi-hop communication, for example, is communication without an intermediate access point, by multi-step communication among numerous terminals (the node group 102). In the given area 101, the nodes of the node group 102 are scattered. The given area 101, for example, is an area filled with matter such as concrete, soil, water, air, etc. Alternatively, the given area 101 may be an area in a vacuum state such as cosmic space.

The node group 102 are wireless communications apparatuses forming a sensor network. More specifically, each node of the node group 102 is a wireless communications apparatus capable of communicating wirelessly with a nearby wireless communications apparatus. Further, each of the nodes of the node group 102 has sensors that detect temperature, pressure, sound, etc. and transmit wireless signals indicating sensing results obtained by the sensor.

Each of the nodes of the node group 102 receives wireless signals transmitted from nearby nodes and by forwarding the received wireless signals to nearby nodes, transfer the wireless signals by multi-hop. As a result, a wireless signal transmitted by a node of the node group 102 is transferred by other nodes of the node group 102 via multi-hop, and is transmitted by nearby wireless communications apparatuses (e.g., the monitoring apparatuses 121 to 128) in the given area 101.

The wireless signals transmitted by the nodes of the node group 102 include hop count information that indicates the hop count from the initial transmission source. The hop count is a number that indicates the number of times a signal is transmitted in multi-hop communication, from the initial transmission source and, for example, is a number that results when 1 is added to the transfer count from the initial transmission source. When transferring a wireless signal, each of the nodes of the node group 102 increment the hop count included in the wireless signal that is to be transferred. As a result, when receiving a wireless signal, a nearby wireless communications apparatus in the given area 101 can obtain information indicating the number of hops for the received wireless signal to reach the nearby wireless communications apparatus by multi-hop.

The nodes of the node group 102, for example, are arranged in the given area 101 by being strewn about in the given area 101 or by being mixed in matter filling the given area 101. Therefore, the position of each node of the node group 102 is unknown. Further, there is unevenness in the arrangement of the nodes of the node group 102; and in the given area 101, a vacant area 103 may exist in which no node is present. In addition, a vacant area 103 in which no node is present may occur consequent to an object such as a pillar in the given area 101. For example, the vacant area 103 is an area of a size in which nodes located on opposite sides cannot directly transmit or receive wireless signals with respect to each other since the radio waves do not reach that far.

The determining apparatus 110 uses the monitoring apparatuses 121 to 128, makes a determination concerning vacant areas 103 in the given area 101, and outputs determination result. The determination concerning a vacant area 103, for example, is a determination of whether a vacant area 103 is present. As a result, when a determination result is output from the determining apparatus 110 and indicates that a vacant area 103 is present in the given area 101, the user can remix the matter filling the given area 101 and remove the vacant area 103.

The determination concerning the vacant area 103 may be a determination of the position of the vacant area 103, a determination of the range of the vacant area 103, and the like. As a result, based on the determination result output from the determining apparatus 110 and concerning the position and/or range of the vacant area 103, the user can add nodes to the vacant area 103 and remove the vacant area 103.

Removal of the vacant area 103 makes the arrangement of the nodes of the node group 102 in the given area 101 more uniform and enables more efficient multi-hop communication of wireless signals. Removal of the vacant area 103 enables improvement of the accuracy of the determination of node position based on the hop count described hereinafter. If the range of the vacant area 103 is to be determined by the determining apparatus 110, in the determination of node position based on the hop count described hereinafter, correction of the estimated position of a node, based on the range of the vacant area 103 becomes possible. As a result, the accuracy of the determination of node position can be improved.

<Hop Count Monitoring Operation>

As depicted in FIG. 1, under the control of the determining apparatus 110, the monitoring apparatus 121 transmits a survey signal to nodes that are near the monitoring apparatus 121 and among the node group 102. The survey signal is a wireless signal that includes hop count information indicating the hop count from the monitoring apparatus that is the initial transmission source.

Each node of the node group 102, upon receiving the survey signal, increments the hop count of the hop count information included in the received survey signal and transmits in a vicinity thereof, a survey signal in which the hop count indicated by the hop count information has been incremented. As a result, the survey signal transmitted by the monitoring apparatus 121 is multi-hop transferred while the hop count of the hop count information is incremented by the node group 102, and is transmitted by the monitoring apparatuses 122 to 128. The monitoring apparatuses 122 to 128 transmit the hop count information included in the received survey signal to the determining apparatus 110.

For example, the hop count of the survey signal received by the monitoring apparatus 122 is assumed to be 4 and the hop count of the survey signal received by the monitoring apparatus 123 is assumed to be 6. If the monitoring apparatuses 122 to 128 receive, via multiple paths, the survey signal transmitted from the monitoring apparatus 121, of the hop count information of the received survey signals, the monitoring apparatuses 122 to 128 transmit to the determining apparatus 110, the hop count information having the smallest hop count.

For example, the monitoring apparatuses 122 to 128 transmit to the determining apparatus 110, the hop count information of the survey signal that is transmitted from the monitoring apparatus 121 and first received. The survey signal having hop count information indicating the smallest hop count is frequently the survey signal transferred by multi-hop, through the shortest path among multiple paths and therefore, the hop count information indicating the smallest hop count can be transmitted to the determining apparatus 110.

The distances between the monitoring apparatus 121 and the monitoring apparatuses 122 to 128 are substantially proportional to the hop counts of the survey signal that the monitoring apparatuses 122 to 128 receive from the monitoring apparatus 121. However, a vacant area 103 is present between the monitoring apparatus 121 and the monitoring apparatus 124 and therefore, the survey signal transmitted from the monitoring apparatus 121 is detoured about the vacant area 103 and received by the monitoring apparatus 124. Consequently, the hop count of the survey signal received by the monitoring apparatus 124 is 9 and is not proportional to the actual distance between the monitoring apparatus 121 and the monitoring apparatus 124.

Under the control the determining apparatus 110, the monitoring apparatuses 122 to 128 also sequentially transmit the survey signal, similar to the monitoring apparatus 121. The monitoring apparatuses 121 to 128 transmit to the determining apparatus 110, the hop count information included in a survey signal that is received by multi-hop communication of the node group 102 and transmitted by another monitoring apparatus. As a result, for each monitoring apparatus combination of the monitoring apparatuses 121 to 128, the determining apparatus 110 can obtain the hop counts between the monitoring apparatuses.

Further, for example, the monitoring apparatuses 121 to 128 transmit the survey signal by the same transmission power as the nodes of the node group 102. As a result, drops in the accuracy of the calculation of the estimated distance based on hop count, occurring consequent to the reached distance of the survey signal transmitted by the monitoring apparatuses 121 to 128 and the reached distance of the survey signal transmitted by the nodes of the node group 102 differing, can be prevented.

<Obtaining Actual Distance Between Monitoring Apparatuses>

The determining apparatus 110, for each monitoring apparatus combination of the monitoring apparatuses 121 to 128, obtains distance information that indicates the actual distance between the monitoring apparatuses. The distance information, for example, is stored to the memory of the determining apparatus 110, in advance. The determining apparatus 110 may obtain the distance information by calculation based on information that indicates position coordinates of the monitoring apparatuses 121 to 128. Further, the position coordinates of the monitoring apparatuses 121 to 128, for example, may be stored in the memory of the determining apparatus 110, in advance, or may be obtained from the monitoring apparatuses 121 to 128.

<Calculation of Estimated Distance Based on Hop Count>

The determining apparatus 110, based on the obtained hop count and for each monitoring apparatus combination of the monitoring apparatuses 121 to 128, calculates an estimated distance between the monitoring apparatuses. Calculation of the estimated distance based on hop count will be described hereinafter (for example, refer to FIG. 8).

<Extraction of Monitoring Apparatus Combination for which Estimated Distance and Actual Distance Differ>

FIG. 2 is a diagram (part 2) depicting an example of determination by the determining system according to the first embodiment. In FIG. 2, portions identical to those in FIG. 1 are given the same reference numerals used in FIG. 1 and description thereof is omitted. The determining apparatus 110 calculates for each monitoring apparatus combination of the monitoring apparatuses 121 to 128, the difference of the calculated estimated distance and the obtained actual distance.

The determining apparatus 110 extracts from among the monitoring apparatus combinations of the monitoring apparatuses 121 to 128, a combination for which the calculated difference is a given threshold or greater. As a result, from among the monitoring apparatus combinations of the monitoring apparatuses 121 to 128, a combination of monitoring apparatuses between which a vacant area 103 is present can be extracted. In the example depicted in FIG. 2, the combination of the monitoring apparatuses 121 and 124, the combination of the monitoring apparatuses 122 and 125, and the combination of the monitoring apparatuses 123 and 126 are assumed to be extracted.

<Calculation of Straight Line Connecting Extracted Monitoring Apparatuses>

The determining apparatus 110, as depicted in FIG. 2, calculates for each extracted monitoring apparatus combination, a straight line connecting the monitoring apparatuses. More specifically, the position coordinates of each monitoring apparatus are respectively assumed to be (x1, y1) and (x2, y2). The position coordinates of the monitoring apparatuses, for example, are stored in the memory of the determining apparatus 110, in advance. The determining apparatus 110 substitutes x1, y1, x2, and y2 into $(y2-y1)x+(x2-x1)y+x2y1-x1y2=0$ and thereby, calculates a straight line connecting the monitoring apparatuses. In the example depicted in FIG. 2, straight lines 211 to 213 are calculated.

<Calculation of Intersection of Straight Lines>

The determining apparatus 110 calculates intersections of the calculated straight lines 211 to 213. More specifically, the determining apparatus 110 calculates the solution to a system of equations of the straight lines 211 to 213 and thereby, calculates intersections of the straight lines 211 to 213. In the example depicted in FIG. 2, intersections 221 to 223 are calculated.

<Calculation of Center of Gravity of Intersections>

The determining apparatus 110 calculates the center of gravity of the calculated intersections 221 to 223. More specifically, assuming the position coordinates of the intersections are $(x1, y1), (x2, y2), \ldots, (xm, ym)$, the determining apparatus 110 can calculate position coordinates of the center of gravity by $((x1+x2+ \ldots +xm)/m, (y1+y2+ \ldots +ym)/m)$. In the example depicted in FIG. 2, m=3 and a center of gravity 230 is calculated.

<Vacant Area Determination>

The determining apparatus 110 determines that a range encompassed by a circle 240 that includes the calculated intersections 221 to 223 and has a center at the calculated center of gravity 230 is a vacant area 103. For example, the determining apparatus 110 calculates the distance between the center of gravity 230 and the intersections 221 to 223. More specifically, the position coordinates of the center of gravity and the position coordinates of an intersection are assumed to be (x1, y1) and (x2, y2), respectively. In this case, the determining apparatus 110 can calculate the distance between the center of gravity and the intersection by $\sqrt{((x2-x1)^2+(y2-y1)^2)}$.

The determining apparatus 110, with respect to $(x-x1)^2+(y-y1)^2=r^2$, substitutes the position coordinates (x1, y1) of the center of gravity 230 for x1, y1, and substitutes the greatest value of the distances between the center of gravity 230 and the intersections 221 to 223 for r. As a result, the circle 240 that includes the calculated intersections 221 to 223 and has a center at the calculated center of gravity 230 can be calculated. The determining apparatus 110, for example, outputs the circle 240 as a determination result.

FIG. 3 is a diagram depicting an example of a hardware configuration of the determining apparatus and the monitoring apparatuses. The determining apparatus 110 and the monitoring apparatuses 121 to 128 depicted in FIGS. 1 and 2, for example, can be realized by an information processing apparatus 300 depicted in FIG. 3. The determining apparatus 110 and the monitoring apparatus 121 may be realized by respectively separate information processing apparatuses 300 or may be realized by a single information processing apparatus 300.

The information processing apparatus 300, for example, runs on an external power source. Further, the information processing apparatus 300 includes a CPU 301, memory 302, a communications unit 303, an antenna 304, an input/output interface 305, and a bus 310. The CPU 301, the memory 302, the communications unit 303, and the input/output interface 305 are connected by the bus 310.

The CPU 301 (central processing unit) governs overall control of the information processing apparatus 300. The memory 302 is, for example, a storage apparatus that includes main memory and auxiliary memory. The main memory, for example, is random access memory (RAM). The main memory is used as a work area of the CPU 301. The auxiliary memory, for example, is nonvolatile memory such as a magnetic disk, an optical disk, and flash memory. The auxiliary memory stores various programs that cause the information processing apparatus 300 to operate. The programs stored in the auxiliary memory are loaded to the main memory and executed by the CPU 301.

The communications unit 303 wirelessly communicates with other communications apparatuses, via the antenna 304. For example, the communications unit 303 wirelessly communicates with the determining apparatus 110 and nearby nodes among the node group 102. Further, communication between the communications unit 303 and the determining apparatus 110 may be by a physical line. The communications unit 303 is controlled by the CPU 301.

The input/output interface 305, for example, includes an input device that receives operational input from the user, and an output device that outputs information to the user, etc. The input device, for example, can be realized by keys (e.g., a keyboard), a remote controller, and the like. The output device, for example, can be realized by a display, a speaker, and the like. Further, the input device and the output device may be realized by a touch panel and the like. The input/output interface 305 is controlled by the CPU 301.

The information processing apparatus 300 receives sensing information from the communications unit 303 and aggregates the sensing information transmitted from the node group 102. The information processing apparatus 300 outputs the aggregated sensing information from the input/output interface 305. The information processing apparatus 300 may transmit the aggregated sensing information, from the communications unit 303, through a network such as the Internet, to an external apparatus such as a user terminal and a server.

FIG. 4 is a diagram depicting an example of a hardware configuration of a node. Each node of the node group 102, for example, can be realized by a wireless communications apparatus 400 depicted in FIG. 4. The wireless communications apparatus 400 includes a harvester 401, a battery 402, a power control unit 403, a sensor 404, a MCU 405, a wireless communications unit 406, an antenna 407, and a bus 410.

The harvester 401 generates power based on the external environment of the installation site of the wireless communications apparatus 400, e.g., energy changes such as changes in light, vibration, temperature, radio waves (received radio waves) and the like. The battery 402 stores power generated by the harvester 401. The power control unit 403 provides the power stored in the battery 402 to components of the wireless communications apparatus 400.

The sensor 404, the MCU 405, and the wireless communications unit 406 are connected by the bus 410. The sensor 404 detects a given displacement at the installation site of the wireless communications apparatus 400. For example, a piezoelectric element that detects voltage at the installation site, a photoelectric element that detects light, and the like can be used as the sensor 404.

The MCU 405 (micro control unit) processes data concerning detection by the sensor 404 and transmits the processed data as a wireless signal to the wireless communications unit 406. Further, the MCU 405 controls the wireless communications unit 406 to increment the hop count of the hop count information included in a wireless signal received by the wireless communications unit 406 and to transmit to communications apparatuses near the wireless communications apparatus 400, a wireless signal having hop count information in which the hop count has been incremented.

The wireless communications unit 406, via the antenna 407, wirelessly communicates with the communications apparatuses near the wireless communications apparatus 400. The communications apparatuses near the wireless communications apparatus 400, for example, are the monitoring apparatuses 121 to 128, and other nodes of the node group 102.

FIG. 5 is a diagram depicting an example of a configuration of the determining apparatus according to the first embodiment. As depicted in FIG. 5, the determining apparatus 110 according to the first embodiment, for example, includes an obtaining unit 501, a control unit 502, a calculating unit 503, and a determining unit 504. The obtaining unit 501 obtains, for each monitoring apparatus combination of the monitoring apparatuses 121 to 128, distance information indicating the actual distance between the monitoring apparatuses. The obtaining unit 501 notifies the determining unit 504 of the distance indicated by the obtained distance information.

The control unit 502 controls the monitoring apparatuses 121 to 128 by performing communication with the monitoring apparatuses 121 to 128. The control unit 502 transmits and receives the survey signals between the monitoring apparatuses 121 to 128, by the multi-hop communication by the node group 102. Further, the control unit 502 obtains from the monitoring apparatuses 121 to 128, the hop count information of the transmitted and received survey signals. The control unit 502 notifies the calculating unit 503 of the hop count indicated by the obtained hop count information.

The calculating unit 503 calculates based on the hop count notified by the control unit 502 and for each monitoring apparatus combination of the monitoring apparatuses 121 to 128, an estimated distance between the monitoring apparatuses. The calculating unit 503 notifies the determining unit 504 of the calculated estimated distance.

Based on a comparison result of the distance notified by the obtaining unit 501 and the estimated distance notified by the calculating unit 503, the determining unit 504 makes a determination about the vacant area 103 in which no wireless communications apparatus of the node group 102 in the given area 101 is present, and outputs a result of the determination.

The obtaining unit 501, for example, can be realized by the CPU 301 and the memory 302 depicted in FIG. 3. The control unit 502, for example, can be realized by the CPU 301 and the communications unit 303 depicted in FIG. 3. The calculating unit 503 and the determining unit 504, for example, can be realized by the CPU 301 depicted in FIG. 3. Further, the determination result output from the determining unit 504, for example, is output to an external destination by the communications unit 303 and/or the input/output interface 305.

Figure 6:
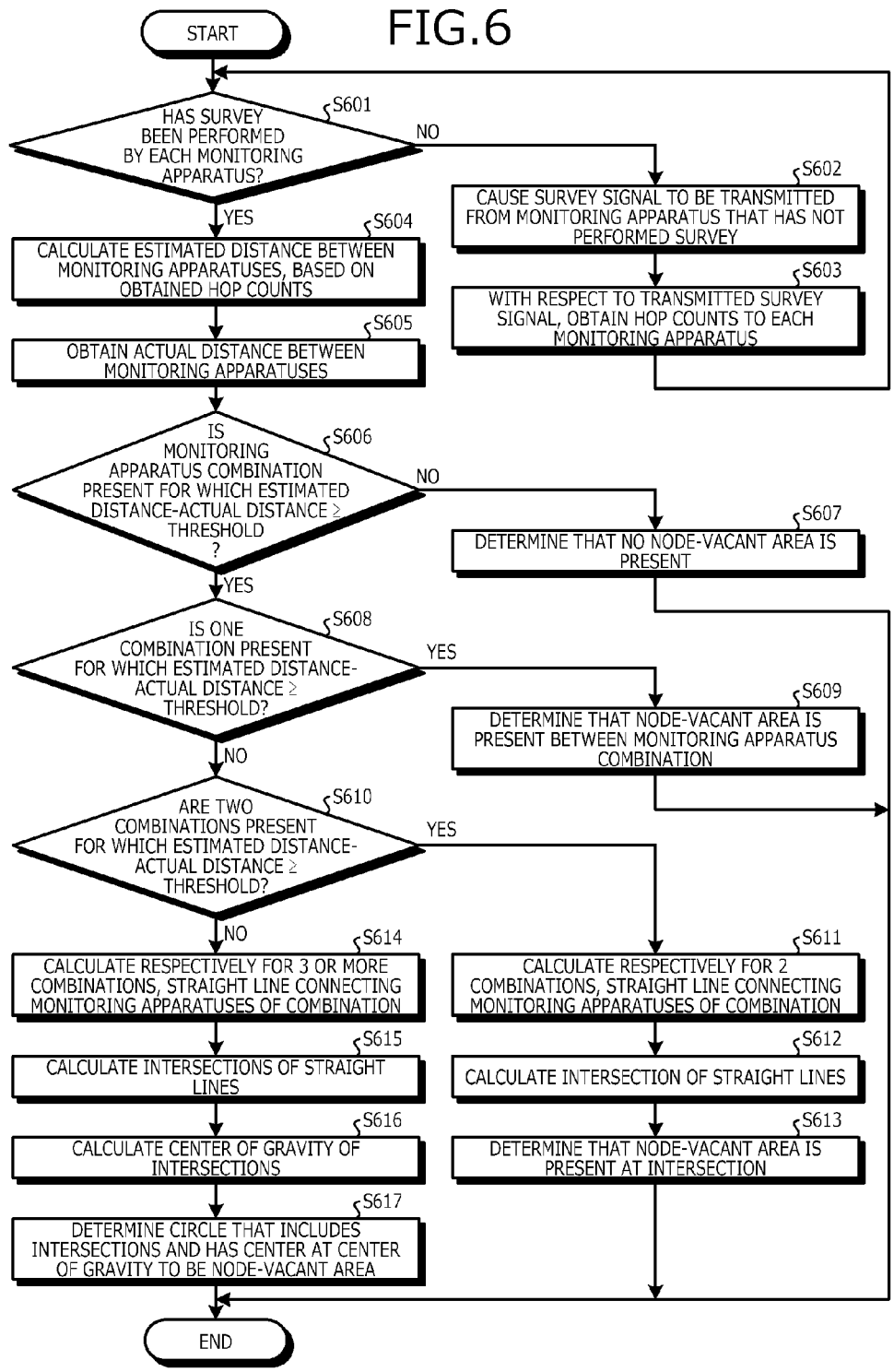
FIG. 6 is a flowchart depicting one example of operation of the determining apparatus according to the first embodiment.

FIG. 6 is a flowchart depicting one example of operation of the determining apparatus according to the first embodiment. The determining apparatus 110 according to the first embodiment, for example, executes the following operations. The determining apparatus 110 determines whether a survey has been performed by each monitoring apparatus (the monitoring apparatuses 121 to 128) (step S601). If surveys have not been performed by all of the monitoring apparatuses (step S601: NO), the determining apparatus 110 causes a survey signal to be transmitted from a monitoring apparatus that is among the monitoring apparatuses 121 to 128 and has not performed a survey (step S602).

The determining apparatus 110, with respect to the survey signal transmitted at step S602, obtains the hop counts to each monitoring apparatus (step S603), and returns to step S601. At step S603, more specifically, the determining apparatus 110 obtains the hop count information included in the received survey signal, from a monitoring apparatus that is among the monitoring apparatuses 121 to 128 and is other than the monitoring apparatus caused to transmit the survey signal at step S602.

At step S601, if a survey has been performed by each monitoring apparatus (step S601: YES), the determining apparatus 110 calculates an estimated distance between the monitoring apparatuses, based on the hop counts obtained at step S603 (step S604). The determining apparatus 110 further obtains the actual distance between the monitoring apparatuses (step S605).

The determining apparatus 110 determines whether a monitoring apparatus combination is present for which the difference of the estimated distance calculated at step S604 and the actual distance obtained at step S605 is a threshold or greater (step S606), The threshold, for example, is stored in the memory of the determining apparatus 110, in advance. If no combination is present for which the difference of the estimated distance and the actual distance is the threshold or greater (step S606: NO), the determining apparatus 110 determines that no node-vacant area is present in the given area 101 (step S607), and ends a series of the operations.

At step S606, if a combination is present for which the difference of the estimated distance and the actual distance is the threshold or greater (step S606: YES), the determining apparatus 110 determines whether one combination is present for which the difference of the estimated distance and the actual distance is the threshold or greater (step S608). If one combination is present for which the difference of the estimated distance and the actual distance is the threshold or greater (step S608: YES), the determining apparatus 110 determines that a node-vacant area is present between the monitoring apparatus combination for which the difference of the estimated distance and the actual distance is the threshold or greater (step S609), and ends a series of the operations.

At step S608, if the number of combinations for which the difference of the estimated distance and the actual distance is the threshold or greater is not one (step S608: NO), the determining apparatus 110 determines whether two combinations are present for which the difference of the estimated distance and the actual distance is the threshold or greater (step S610). If two combinations are present for which the difference of the estimated distance and the actual distance is the threshold or greater (step S610: YES), the determining apparatus 110 calculates for each of the combinations, a straight line connecting the monitoring apparatuses of the combination (step S611).

The determining apparatus 110 calculates an intersection of the straight lines calculated at step S611 (step S612). The determining apparatus 110 determines that a node-vacant area is present at the intersection calculated at step S612 (step S613), ends a series of the operations.

At step S610, if the number of combinations for which the difference of the estimated distance and the actual distance is the threshold or greater is three or more (step S610: NO), the determining apparatus 110 transitions to step S614. In other words, the determining apparatus 110 calculates for each of the combinations for which the difference of the estimated distance and actual distance is the threshold or greater, a straight line connecting the monitoring apparatuses of the combination (step S614).

The determining apparatus 110 calculates intersections of the straight lines calculated at step S614 (step S615), and calculates the center of gravity of the intersections calculated at step S615 (step S616). The determining apparatus 110 determines a circle that includes the intersections calculated at step S615 and has a center at the center of gravity calculated at step S616 to be a node-vacant area (step S617), and ends a series of the operations.

Figure 7:
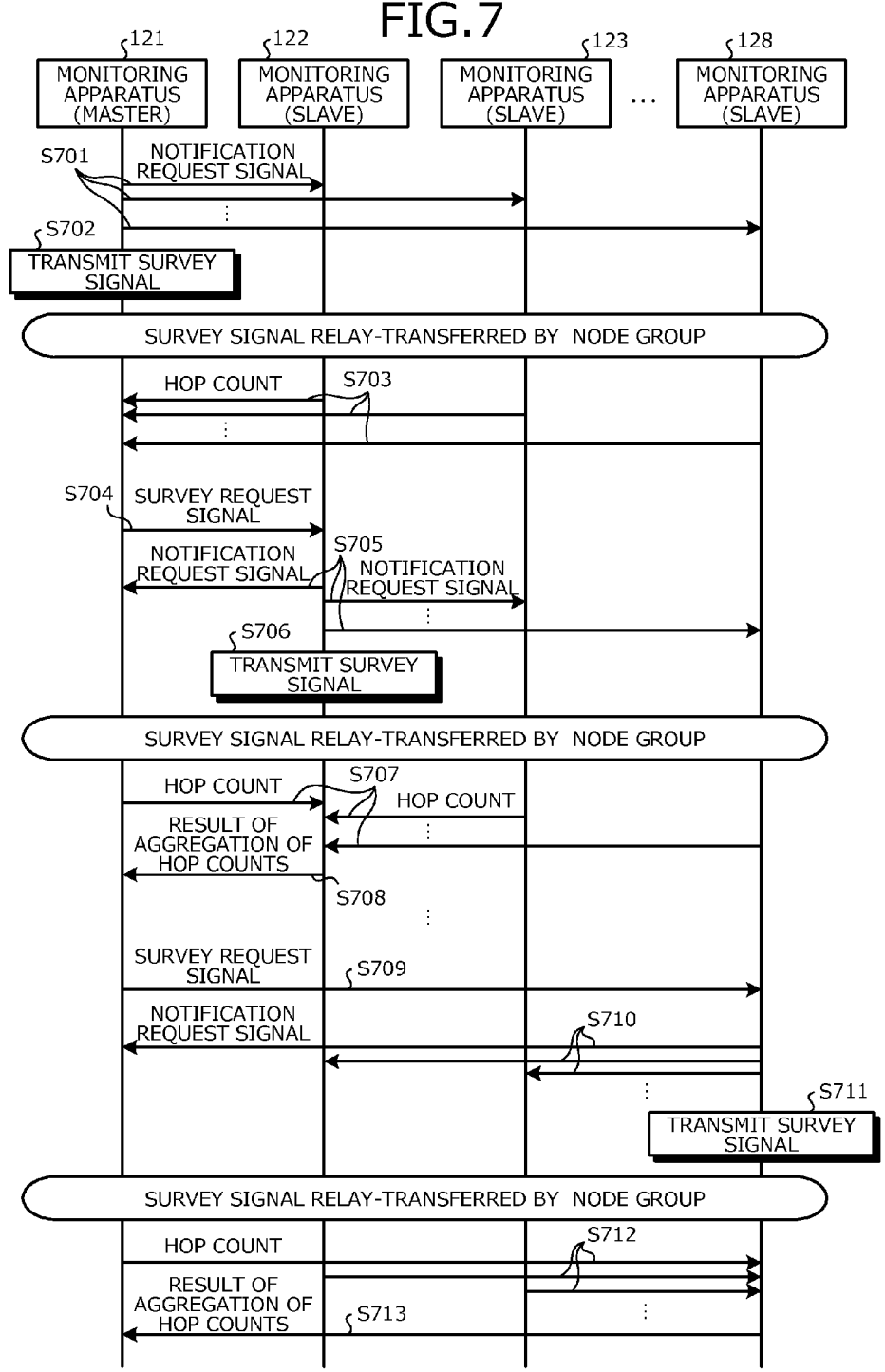
FIG. 7 is a sequence diagram of an example of hop count monitoring operation by the determining system.

FIG. 7 is a sequence diagram of an example of hop count monitoring operation by the determining system. For example, by providing the determining apparatus 110 in the monitoring apparatus 121, the monitoring apparatus 121 becomes a master, the monitoring apparatuses 122 to 128 become slaves, and monitoring operations are performed.

The monitoring apparatus 121 transmits to the monitoring apparatuses 122 to 128, a notification request signal requesting notification of the hop count (step S701). The monitoring apparatus 121 wirelessly transmits a survey signal to nodes that are of the node group 102 and near the monitoring apparatus 121 (step S702). As a result, the survey signal transmitted by the monitoring apparatus 121 is multi-hop transferred by the node group 102, and the multi-hop transferred survey signal is received by the monitoring apparatuses 122 to 128.

The monitoring apparatuses 122 to 128 notify the monitoring apparatus 121 of the hop count of the received survey signal (step S703). As a result, the monitoring apparatus 121 can obtain the respective hop counts between the monitoring apparatus 121 and the monitoring apparatuses 122 to 128.

The monitoring apparatus 121 transmits to the monitoring apparatus 122, a survey request signal requesting performance of a survey (step S704). The monitoring apparatus 122 transmits to the monitoring apparatuses 121, 123 to 128, a notification request signal requesting notification of the hop count (step S705). The monitoring apparatus 122 wirelessly transmits a survey signal to nodes that are of the node group 102 and near the monitoring apparatus 122 (step S706). As a result, the survey signal transmitted by the monitoring apparatus 122 is multi-hop transferred by the node group 102, and the multi-hop transferred survey signal is received by the monitoring apparatuses 121, 123 to 128.

The monitoring apparatuses 121, 123 to 128 notify the monitoring apparatus 122 of the hop count of the received survey signal (step S707). The monitoring apparatus 122 notifies the monitoring apparatus 121 of a result of aggregation of the hop counts notified at step S707 (step S708). As a result, the monitoring apparatus 121 can obtain the respective hop counts between the monitoring apparatus 122 and the monitoring apparatuses 121, 123 to 128.

The monitoring apparatus 121, similar to the monitoring apparatus 122, transmits a survey request signal to the monitoring apparatuses 123 to 127, thereby causing surveys to be performed, and obtains the respective hop counts.

The monitoring apparatus 121 transmits to the monitoring apparatus 128, a survey request signal requesting performance of a survey (step S709). The monitoring apparatus 128 transmits to the monitoring apparatuses 121 to 127, a notification request signal requesting notification of the hop count (step S710). The monitoring apparatus 128 wirelessly transmits a survey signal to nodes that are of the node group 102 and near the monitoring apparatus 128 (step S711). As a result, the survey signal transmitted by the monitoring apparatus 128 is multi-hop transferred by the node group 102, and the multi-hop transferred survey signal is received by the monitoring apparatuses 121 to 127.

The monitoring apparatuses 121 to 127 notify the monitoring apparatus 128 of the hop count of the received survey signal (step S712). The monitoring apparatus 128 notifies the monitoring apparatus 121 of a result of aggregation of the hop counts notified at step S712 (step S713). As a result, the monitoring apparatus 121 can obtain the respective hop counts between the monitoring apparatus 128 and the monitoring apparatuses 121 to 127.

Further, before the monitoring operations depicted in FIG. 7, each node of the node group 102 may be charged. Charging of the nodes of the node group 102, for example, can be performed according to the type of the harvester 401 depicted in FIG. 4. For example, if the harvester 401 generates power by environmental electromagnetic waves, the nodes of the node group 102 can be charged by providing to the given area 101, electromagnetic waves for charging the nodes.

As a result, the nodes of the node group 102 can more assuredly and at the same power, transmit the survey signal and therefore, the actual distance between the monitoring apparatuses and the hop count of the survey signal become easier to proportionalize. Therefore, a more accurate estimated distance between the monitoring apparatuses can be calculated. Charging of the nodes of the node group 102, for example, can be performed by the determining apparatus 110.

Figure 8:
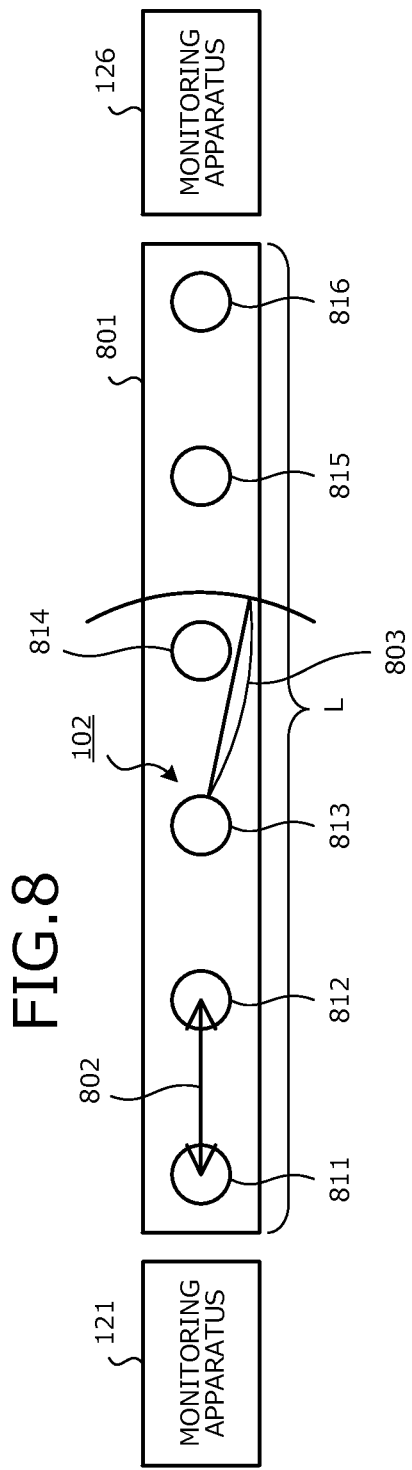
FIG. 8 is a diagram depicting a calculation example of an estimated distance based on hop count.

FIG. 8 is a diagram depicting a calculation example of the estimated distance based on hop count. As described, for each of the monitoring apparatus combinations of the monitoring apparatuses 121 to 128, the determining apparatus 110 calculates an estimated distance between the monitoring apparatuses, based on hop counts.

FIG. 8 depicts a partial area 801 that is in the given area 101 and between the monitoring apparatus 121 and the monitoring apparatus 126. Nodes 811 to 816 represent nodes that are among the node group 102 and included in the partial area 801. In FIG. 8, the nodes 811 to 816 are assumed to be arranged at even intervals in a straight line.

The determining apparatus 110 obtains an average distance 802 between the nodes of the node group 102 in the given area 101. For example, the determining apparatus 110 calculates the distance 802 between the nodes, based on the density [nodes/area] of the node group 102 in the given area 101. More specifically, assuming the density of the node group 102 in the given area 101 to be $\rho$, the distance 802 between the nodes can be calculated by $1/\sqrt{\rho}$.

The determining apparatus 110 obtains a reachable distance 803 of radio waves transmitted by the nodes of the node group 102. The reachable distance 803 of the radio waves, for example, is stored to the memory of the determining apparatus 110, in advance.

The determining apparatus 110 can calculate an estimated distance between the monitoring apparatuses by (distance between nodes)×(hop count), when (distance between nodes)≤(reachable distance of radio wave)<(distance between nodes)×2 is true. Further, the determining apparatus 110 can calculate an estimated distance between the monitoring apparatuses by (distance between nodes)×2×(hop count), when (distance between nodes)×2≤(reachable distance of radio wave)<(distance between nodes)×3 is true.

Similarly, the determining apparatus 110 can calculate an estimated distance between the monitoring apparatuses by (distance between nodes)×n×(hop count), when (distance between nodes)×n≤(reachable distance of radio wave)<(distance between nodes)×(n+1) is true. In this manner, the determining apparatus 110 calculates the estimated distance based on a product of the distance between nodes of the node group 102, hop count, and a coefficient corresponding to the reachable distance of the wireless signals transmitted by the nodes of the node group 102. As a result, the estimated distance can be calculated with high accuracy.

Further, when (reachable distance of radio wave)<(distance between nodes) is true, transmitted wireless signals cannot reach other nodes and the configuration fails as a sensor network. In this case, the determining apparatus 110 may output alarm information to the user.

In FIG. 8, although description has been given assuming that the nodes 811 to 816 are arranged at even intervals in a straight line, the distance 802 between nodes may be calculated taking into consideration a case where the nodes 811 to 816 are not arranged at even intervals or in a straight line. For example, the determining apparatus 110 calculates the area of the partial area 801. Assuming the actual distance between the monitoring apparatus 121 and the monitoring apparatus 126 is L, a length of the partial area 801 along a lateral direction is L. Further, a length of the partial area 801 along a longitudinal direction is assumed to be a length that is 3/2 of the average distance 802 ($1/\sqrt{\rho}$) between nodes.

In this case, the determining apparatus 110 can calculate the area of the partial area 801 between the monitoring apparatus 121 and the monitoring apparatus 126 by $L \cdot (1/\sqrt{\rho}) \cdot (2/3)$. Therefore, the determining apparatus 110 can calculate the number of nodes actually in the partial area 801 by $L \cdot (1/\sqrt{\rho}) \cdot (2/3) \cdot \rho$.

The determining apparatus 110 divides the actual distance L between the monitoring apparatus 121 and the monitoring apparatus 126 by the calculated number of nodes in the partial area 801. In other words, the determining apparatus 110 calculates $(1/\sqrt{\rho}) \cdot (3/2)$. As a result, distances between nodes can be calculated taking into consideration differences in the distribution of the nodes.

Thus, the determining apparatus 110 according to the first embodiment calculates an estimated distance between monitoring apparatuses based on hop counts of wireless signals transmitted and received (via the node group 102) by the nearby monitoring apparatuses 121 to 128 of the node group 102. The determining apparatus 110 compares the estimated distance and the actual distance and thereby, can make a determination about a vacant area 103 void of a node.

Further, the determining apparatus 110 uses the monitoring apparatuses 121 to 128 provided encompassing the given area 101 and the node group 102 scattered in the given area 101 and thereby, for example, can make a determination about the vacant area 103 more easily than by using a visual survey, measurement instrument such as an X ray imaging device, a sonic survey, etc.

For example, in the determining system 100 depicted in FIGS. 1 and 2, although description of a case in which eight monitoring apparatuses (the monitoring apparatuses 121 to 128) are used to make a determination about the vacant area 103, two or more monitoring apparatuses may be used. For example, by using two or more monitoring apparatuses, one or more combinations of monitoring apparatuses for which the difference of the estimated distance and the actual distance is a threshold or greater can be extracted and therefore, the presence/absence of a vacant area 103 and a straight line that includes the position at which a vacant area 103 exists can be determined. Further, for example, by using four or more monitoring apparatuses, position coordinates where a vacant area 103 exists can be calculated and therefore, the position of a vacant area 103 can be determined.

Figure 9:
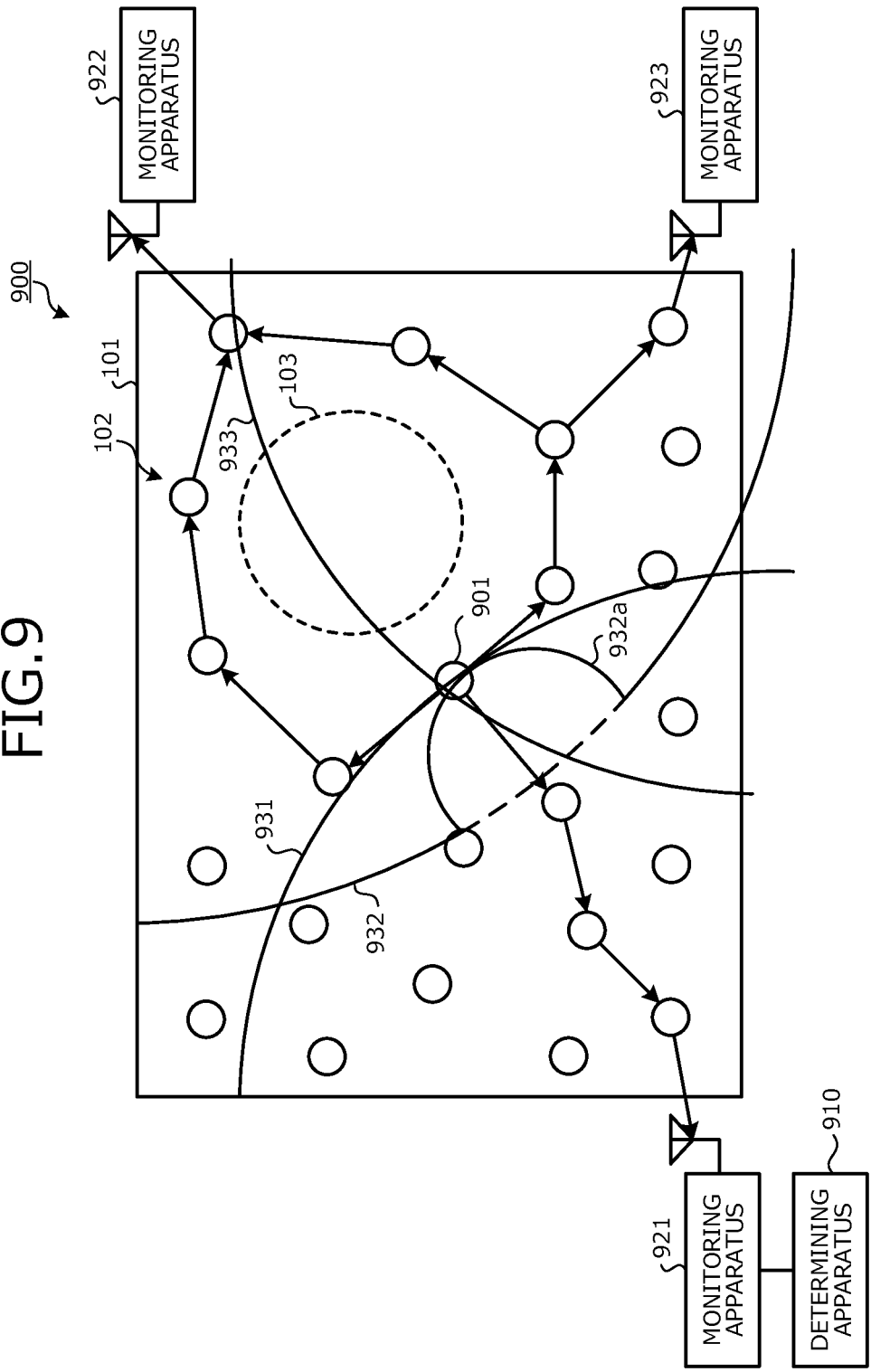
FIG. 9 is a diagram depicting an example of the determining system according to a second embodiment.

FIG. 9 is a diagram depicting an example of the determining system according to a second embodiment. In FIG. 9, portions identical to those depicted in FIGS. 1 and 2 are given the same reference numerals used in FIGS. 1 and 2, and description thereof is omitted. As depicted in FIG. 9, a determining system 900 according to the second embodiment includes a determining apparatus 910 and monitoring apparatuses 921 to 923. The monitoring apparatuses 921 to 923 respectively, for example, may be any of the monitoring apparatuses 121 to 128 depicted in FIGS. 1 and 2. The monitoring apparatuses 921 to 923 are provided so as to encompass the given area 101.

The determining apparatus 910 is an apparatus that can communicate with the monitoring apparatuses 921 to 923. Further, the determining apparatus 910 may be an apparatus that is provided separately from the monitoring apparatuses 921 to 923, or may be an apparatus that is provided in any one of the monitoring apparatuses 921 to 923. In the example depicted in FIG. 9, the determining apparatus 910 is provided in the monitoring apparatus 921.

The given area 101 depicted in FIG. 9, similar to the given area 101 depicted in FIG. 1, has the node group 102 scattered therein and the vacant area 103 in which no node is present. A target node 901 included in the node group 102 is assumed to have transmitted a wireless signal in a vicinity thereof. For example, the target node 901 transmits a wireless signal indicating sensing results obtained by a sensor of the target node 901. The wireless signal transmitted by the target node 901 is multi-hop transferred by the node group 102 while the hop count indicated by hop count information is incremented, and the wireless signal is received by the monitoring apparatuses 921 to 923. The monitoring apparatuses 921 to 923 transmit to the determining apparatus 910, the hop count information of the received wireless signal.

The determining apparatus 910 is a determining apparatus that determines the position of the target node 901. More specifically, the determining apparatus 910 calculates based on the hop count information received from the monitoring apparatuses 921 to 923, estimated distances between the target node 901 and the monitoring apparatuses 921 to 923. The calculation of the estimated distances based on the hop count information, for example, can be performed by the method depicted in FIG. 8.

Based on the calculated estimated distances, the determining apparatus 910 calculates estimation curves 931 to 933 that originate at the monitoring apparatuses 921 to 923, respectively. For example, the estimation curve 931 is centered about the monitoring apparatus 921 and is an arc whose radius is the estimated distance between the target node 901 and the monitoring apparatus 921.

Further, the determining apparatus 910 obtains vacant area information that indicates the range of the vacant area 103. The vacant area information, for example, is input to the determining apparatus 910 by the user and is stored to the memory of the determining apparatus 910. For example, the user measures the position of the vacant area 103 in the given area 101. Measurement of the position of the vacant area 103, for example, can be performed using a visual survey, a measuring instrument (X ray imaging device, etc.), sonic survey, and the like. Further, the determination result by the determining apparatus 110 may be used as the vacant area information.

Since the vacant area 103 is present between the estimation curve 932 and the monitoring apparatus 922, the determining apparatus 910 corrects the estimation curve 932 based on the vacant area information, which indicates the range of the vacant area 103. Estimation curve correction based on the vacant area information will be described hereinafter (for example, refer to FIG. 10. An estimation curve 932*a* is the estimation curve 932 after correction. The determining apparatus 910 calculates intersections of the estimation curves 931, 932*a*, 933 and thereby, determines the position of the target node 901. As a result, the position of the target node 901, which is the transmission source of the wireless signal, can be determined more accurately.

FIG. 10 is a diagram (part 1) depicting an example of estimation curve correction by the determining system. In FIG. 10, portions identical to those in FIG. 9 are given the same reference numerals used in FIG. 9 and description thereof is omitted. For example, the monitoring apparatus 921 and the monitoring apparatus 922 are assumed to be arranged to sandwich the vacant area 103.

<Calculation of Effect Level Per Unit Length of Vacant Area>

The determining apparatus 910 calculates for the estimated distance based on hop count, the effect level per unit length of the vacant area 103. More specifically, the determining apparatus 910 causes a survey signal (wireless signal) to be transmitted and received between the monitoring apparatus 921 and the monitoring apparatus 922, by multi-hop communication by the node group 102 and thereby, obtains the hop count of the wireless signal between the monitoring apparatus 921 and the monitoring apparatus 922. The determining apparatus 910 calculates an estimated distance between the monitoring apparatus 921 and the monitoring apparatus 922, based on the obtained hop count. The calculation of estimated distance based on hop count is identical to the estimated distance calculation depicted in FIG. 8.

The determining apparatus 910 obtains distance information that indicates the actual distance between the monitoring apparatus 921 and the monitoring apparatus 922. The distance information, for example, is stored in the memory of the determining apparatus 910, in advance. The determining apparatus 910 may obtain the distance information by a calculation based on information indicating the position coordinates of the monitoring apparatuses 921, 922. The position coordinates of the monitoring apparatuses 921, 922, for example, may be stored in the memory of the determining apparatus 910, in advance or may be obtained from the monitoring apparatuses 921, 922.

The determining apparatus 910 calculates the difference of the estimated distance and actual distance between the monitoring apparatus 921 and the monitoring apparatus 922.

The determining apparatus 910 calculates a straight line connecting the monitoring apparatus 921 and the monitoring apparatus 922. More specifically, the position coordinates of the monitoring apparatuses 921, 922 are assumed to be (x1, y1) and (x2, y2), respectively. The determining apparatus 910 can calculate a straight line connecting the monitoring apparatuses 921, 922 by substituting x1, y1, x2, y2 into $(y2-y1)x+(x2-x1)y+x2y1-x1y2=0$. In the example depicted in FIG. 10, a straight line 1010 is calculated.

The determining apparatus 910 calculates intersections of the calculated straight line 1010 and the border of the vacant area 103. More specifically, the determining apparatus 910 calculates the solution to a system of equations including an equation representing the straight line 1010 and an equation representing the range of the vacant area 103 and thereby, calculates intersections of the straight line 1010 and the border of the vacant area 103. In the example depicted in FIG. 10, intersections 1021, 1022 are calculated.

The determining apparatus 910 calculates the distance between the intersections 1021, 1022. The determining apparatus 910 divides the difference of the estimated distance and the actual distance between the monitoring apparatus 921 and the monitoring apparatus 922 by the distance between the intersections 1021, 1022. As a result, in the estimated distance based on hop count, the effect level per unit length of the vacant area 103 can be calculated.

<Estimation Curve Calculation>

FIG. 11 is a diagram (part 2) depicting an example of estimation curve correction by the determining system. The determining apparatus 910 calculates an arc whose center is at the position coordinates of the monitoring apparatus 922 and whose radius is the estimated distance between the target node 901 and the monitoring apparatus 922, based on the hop count from the target node 901 (refer to FIG. 9). As a result, an estimation curve 1110 based on the monitoring apparatus 922 can be calculated.

The determining apparatus 910 determines whether at least one portion of a vacant area 103 is present between the position coordinates of the monitoring apparatus 922 and the estimation curve 1110. If no vacant area 103 is present between the position coordinates of the monitoring apparatus 922 and the estimation curve 1110, the determining apparatus 910 does not correct the estimation curve 1110.

If at least one portion of a vacant area 103 is present between the position coordinates of the monitoring apparatus 922 and the estimation curve 1110, the determining apparatus 910 selects a point 1111 on the estimation curve 1110 and calculates a straight line 1112 connecting the monitoring apparatus 922 and the point 1111.

For example, the position coordinates of the monitoring apparatus 922 are assumed to be (x0, y0), and a point (x1, y1) on the perimeter of a circle whose radius is r satisfies $(x1-x0)^2+(y1-y0)^2=r^2$. Therefore, a straight line passing through the point 1111 and the position coordinates (x0, y0) of the monitoring apparatus 922 is $(x-x1)/(x0-x1)=(y-y1)/(y0-y1)$.

The determining apparatus 910 calculates the distance between intersections 1121, 1122 of the straight line 1112 and the vacant area 103, if the calculated straight line 1112 has a portion overlapping the vacant area 103. For example, the position coordinates of the intersections 1121, 1122 are assumed to be (x1, y1) and (x2, y2), and the distance between the intersections is $\sqrt{((x2-x1)^2+(y2-y1)^2)}$. Therefore, the length of the portion of the straight line 1112 overlapping the vacant area 103 can be calculated.

The determining apparatus 910 multiplies the obtained effect level per unit length of the vacant area 103 by the calculated distance between the intersections 1121, 1122. As a result, the effect level of the vacant area 103 at the point 1111 can be calculated.

The determining apparatus 910 causes the point 1111 to move by the distance of the calculated product, toward the position coordinates of the monitoring apparatus 922. The point 1111a is the point 1111 after movement toward the position coordinates of the monitoring apparatus 922, by the distance of the calculated product. More specifically, the determining apparatus 910 calculates the point 1111a by calculating the point (x, y), which is $(x-x1)/(x0-x1)=(y-y1)/(y0-y1)$ and $(x1-x)^2+(y1-y)^2=$(effect level of vacant area 103 at point 1111)$^2$. As a result, the point 1111 on the estimation curve 1110 can be corrected based on the effect level of the vacant area 103.

FIG. 12 is a diagram (part 3) depicting an example of estimation curve correction by the determining system. As depicted in FIG. 12, by performing the correction performed for the point 1111 on the estimation curve 1110 with respect to other points on the estimation curve 1110, the determining apparatus 910 can obtain an estimation curve 1110a, which is the estimation curve 1110 after correction based on the effect level of the vacant area 103.

The determining apparatus 910 and the monitoring apparatuses 921 to 923, for example, can be realized by the information processing apparatus 300 depicted in FIG. 3. The determining apparatus 910 and the monitoring apparatuses 921 to 923 may be realized by separate information processing apparatuses 300 or may be realized by a single information processing apparatus 300. Further, the determining apparatus 110 according to the first embodiment and the determining apparatus 910 according to the second embodiment can be realized by a single information processing apparatus 300.

FIG. 13 is a diagram depicting an example of a configuration of the determining apparatus according to the second embodiment. As depicted in FIG. 13, the determining apparatus 910 according to the second embodiment includes an obtaining unit 1301, a calculating unit 1302, a correcting unit 1303, and a determining unit 1304.

The obtaining unit 1301 regards each of the monitoring apparatuses 921 to 923 as a target monitoring apparatus and obtains hop count information indicating the hop count for a wireless signal transmitted from a target node 901 (target wireless communications apparatus) and to be received by the target monitoring apparatus by multi-hop communication by the node group. The obtaining unit 1301 notifies the calculating unit 1302 of the hop count indicated by the obtained hop count information.

The calculating unit 1302 regards each of the monitoring apparatuses 921 to 923 as a target monitoring apparatus, and calculates an estimated distance between the target monitoring apparatus and the target node 901, based on the hop count notified from the obtaining unit 1301. The calculating unit 1302 regards each of the monitoring apparatuses 921 to 923 as a target monitoring apparatus and calculates based on the calculated estimated distance, an estimation line (estimation curve) that indicates candidates of the position of the target node 901. The calculating unit 1302 notifies the correcting unit 1303 of the calculated estimation curve.

The correcting unit 1303 obtains vacant area information indicating the range of a vacant area 103 in which no node of the node group 102 of the given area 101 is present. The correcting unit 1303 regards each of the monitoring apparatuses 921 to 923 as a target monitoring apparatus and corrects based on the obtained vacant area information, the estimation curve notified by the calculating unit 1302. The correcting unit 1303 notifies the determining unit 1304 of the corrected estimation curve.

The determining unit 1304 determines the position of the target node 901 based on an intersection of the estimation curves notified by the correcting unit 1303. The determining unit 1304 outputs a determination result.

The obtaining unit 1301, for example, can be realized by the CPU 301 and the communications unit 303 depicted in FIG. 3. The calculating unit 1302, the correcting unit 1303, and the determining unit 1304, for example, can be realized by the CPU 301 depicted in FIG. 3. Further, the determination result output from the determining unit 1304, for example, is output to an external destination by the communications unit 303 and/or the input/output interface 305.

FIG. 14 is a flowchart depicting an example of determination operation of the determining apparatus according to the second embodiment. The determining apparatus 910 according to the second embodiment, for example, executes the following operations. The determining apparatus 910 determines whether estimation curves based on each of the monitoring apparatuses (the monitoring apparatuses 921 to 923) have been calculated (step S1401). If an estimation curve has not be calculated for any one of the monitoring apparatuses (step S1401: NO), the determining apparatus 910 obtains vacant area information (step S1402). The obtaining of the vacant area information may be performed before step S1401.

The determining apparatus 910 obtains the hop count of the wireless signal, i.e., the hop count from the target node 901 to the target monitoring apparatus for which no estimation curve has been calculated (step S1403). The determining apparatus 910 calculates an estimated distance between the target monitoring apparatus and the target node 901, based on the hop count obtained at step S1403 (step S1404).

The determining apparatus 910, as an estimation curve based on the target monitoring apparatus, calculates a circle whose center is the target monitoring apparatus and whose radius is the estimated distance calculated at step S1404 (step S1405). The determining apparatus 910 determines based on the vacant area information obtained at step S1402, whether a vacant area is present between the target monitoring apparatus and the estimation curve calculated at step S1405 (step S1406).

At step S1406, if no vacant area is present (step S1406: NO), the determining apparatus 910 returns to step S1401. If a vacant area is present (step S1406: YES), the determining apparatus 910 corrects based on the vacant area information obtained at step S1402, the estimation curve calculated at step S1405 (step S1407), and returns to step S1401. The estimation curve correction will be described hereinafter (for example, refer to FIG. 15).

At step S1401, if estimation curves based on each of the monitoring apparatuses have been calculated (step S1401: YES), the determining apparatus 910 calculates intersections of the calculated estimation curves (step S1408). The determining apparatus 910 calculates the center of gravity of the intersections calculated at step S1408 and thereby, determines the position of the target node (step S1409), and ends a series of operations.

FIG. 15 is a flowchart depicting an example of correction operation of the determining apparatus according to the second embodiment. The determining apparatus 910, for example, executes the following operations as the estimation curve correction operation at step S1407 depicted in FIG. 14.

The determining apparatus 910 obtains the effect level per unit length of the vacant area indicated by the vacant area information (step S1501). The determining apparatus 910 determines whether points on the estimation curve based on the target monitoring apparatus have been subject to processing at step S1503 described hereinafter (step S1502). If the points on the estimation curve have not been processed (step S1502: NO), the determining apparatus 910 regards an unprocessed point among the points on the estimation curve as a target point, and calculates a straight line connecting the target point and the target monitoring apparatus (step S1503).

The determining apparatus 910 determines based on the vacant area information, whether a portion of the straight line calculated at step S1503 overlaps the vacant area (step S1504). If no overlapping portion is present (step S1504: NO), the determining apparatus 910 returns to step S1502. If an overlapping portion is present (step S1504: YES), the determining apparatus 910 calculates the length of the portion of the straight line calculated at step S1503 and overlapping the vacant area (step S1505).

The determining apparatus 910 multiples the effect level per unit length obtained at step S1501 by the length of the overlapping portion calculated at step S1505 (step S1506). The determining apparatus 910 causes the target point on the estimation curve based on the target monitoring apparatus to move toward the target monitoring apparatus by the distance of the product calculated at step S1506 (step S1507), and returns to step S1502.

At step S1502, if the points on the estimation curve have been processed (step S1502: YES), the determining apparatus 910 ends a series of the correction operations. As a result, the estimation curve can be corrected based on the vacant area information.

Thus, based on the range of the vacant area 103, in which no node is present, the determining apparatus 910 according to the second embodiment corrects the node-position estimation curves 931 to 933 that are based on the hop count from the target node 901 to the monitoring apparatuses 921 to 923. As a result, even if a vacant area 103 is present between the target node 901 and any one of the monitoring apparatuses 921 to 923, the position of the target node 901 can be determined with good accuracy.

Further, by combining the first embodiment and the second embodiment, a determining apparatus can be realized that executes determination concerning the vacant area 103 and determination of the position of the target node 901 based on the determination result of the vacant area 103 and the hop count.

The determining method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

In each of the embodiments described, although a configuration has been described that determines position based on 2-dimensional position coordinates, the configuration may be one that determines position based in 3-dimensional position coordinates. For example, a straight line passing through two 3-dimensional position coordinates $(x1, y1, z1)$, $(x2, y2, z2)$ can be calculated by $(x-x1)/(x2-x1)=(y-y1)/(y2-y1)=(z-z1)/(z2-z1)$.

Further, the center of gravity of three or more 3-dimensional position coordinates $(x1, y1, z1)$, $(x2, y2, z2)$, ..., $(xm, ym, zm)$ can be calculated by $((x1+x2+ \ldots +xm)/m, (y1+y2+ \ldots +ym)/m, (z1+z2+ \ldots +zm)/m)$.

The distance between two 3-dimensional position coordinates $(x1, y1, z1)$, $(x2, y2, z2)$ can be calculated by $\sqrt{((x2-x1)^2+(y2-y1)^2+(z2-z1)^2)}$.

A sphere whose center is at the 3-dimensional position coordinates $(x1, y1, z1)$ and whose radius is r, can be calculated by $(x-x1)^2+(y-y1)^2+(z-z1)^2=r^2$.

Further, a point $(x1, y1, z1)$ on the surface of the sphere whose center is at the 3-dimensional position coordinates $(x0, y0, z0)$ and whose radius is r, can be calculated by $(x1-x0)^2+(y1-y0)^2+(z1-z0)^2=r^2$. A straight line passing through the point $(x1, y1, z1)$ on the surface of the sphere and the center of the sphere $(x0, y0, z0)$ can be calculated by $(x-x1)/(x0-x1)=(y-y1)/(y0-y1)=(z-z1)/(z0-z1)$.

A point that results by moving the 3-dimensional position coordinates (x1, y1, z1) a given distance can be calculated by calculating a point (x, y, z) that is $(x-x1)/(x0-x1)=(y-y1)/(y0-y1)=(z-z1)/(z0-z1)$ and $(x1-x)^2+(y1-y)^2+(z1-z)^2=(\text{given distance})^2$.

Further, the distance between nodes in the given area 101 can be calculated based on the density [node/area] of the node group 102 in the given area 101. For example, the distance between nodes in the given area 101 can be calculated by $1/\rho^{1/3}$, where $\rho$ is the density of the node group 102 in the given area 101.

According to one aspect of the present invention, an effect is achieved in that node-vacant areas can be determined.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A determining method executed by a processor, the determining method comprising:
   obtaining distance information that indicates a distance between monitoring apparatuses disposed to encompass a given area in which wireless communications apparatuses are scattered;
   causing a wireless signal to be transmitted and received between the monitoring apparatuses by multi-hop communication among the wireless communications apparatuses;
   calculating an estimated distance between the monitoring apparatuses, based on a hop count of the wireless signal multi-hop communicated among the monitoring apparatuses; and
   making a determination concerning a vacant area in which none of the wireless communications apparatuses is present, based on a result of comparison of the distance indicated by the obtained distance information and the calculated estimated distance.

2. The determining method according to claim 1, wherein the monitoring apparatuses include at least four monitoring apparatuses encompassing the given area,
   the obtaining includes obtaining the distance information for respective combinations of the monitoring apparatuses,
   the calculating includes calculating the estimated distance for the respective combinations of the monitoring apparatuses, and
   the making of the determination includes extracting from among the respective combinations of the monitoring apparatuses, a combination for which a difference of the distance indicated by the distance information and the estimated distance is at least a threshold, and determining a position of the vacant area, based on an extraction result.

3. The determining method according to claim 2, wherein the making of the determination includes when the combination for which the difference is at least the threshold is extracted in plural, calculating for each extracted combination, a straight line connecting the monitoring apparatuses of the combination, and determining the position of the vacant area, based on an intersection of the calculated straight lines.

4. The determining method according to claim 3, wherein the making of the determination includes when the combination for which the difference is at least the threshold is extracted in a plurality of at least three combinations, calculating intersections of the straight lines, and determining a range of the vacant area, based on a center of gravity of the calculated intersections and the intersections.

5. The determining method according to claim 4, wherein the making of the determination includes determining that a range encompassed by a circle that has a center at the center of gravity and includes the intersections is the vacant area.

6. The determining method according to claim 5, wherein the making of the determination includes calculating a greatest value among distances between the center of gravity and each of the intersections, and determining that the range encompassed by the circle that has a center at the center of gravity and a radius of the calculated greatest value is the vacant area.

7. The determining method according to claim 1, wherein the calculating includes calculating the estimated distance based on the hop count and, a distance between the wireless communications apparatuses and calculated from a density of the wireless communications apparatuses in the given area.

8. The determining method according to claim 7, wherein the calculating includes calculating the estimated distance based on a product of the distance between the wireless communications apparatuses, the hop count, and a coefficient corresponding to a reachable distance of the wireless signal transmitted by the wireless communications apparatuses.

9. The determining method according to claim 1, wherein the monitoring apparatuses transmit the wireless signal at a power equal to the power at which the wireless communications apparatuses transmit the wireless signal.

10. The determining method according to claim 1, wherein
    each monitoring apparatus among the monitoring apparatuses, when receiving from multiple paths of the wireless communications apparatuses, the wireless signal for which a transmission source is identical, obtains the hop count that is smallest among the hop counts of the received wireless signal.

11. A non-transitory, computer-readable recording medium that stores therein, a determining program causing a computer to execute a process comprising:
    obtaining distance information that indicates a distance between wireless communications apparatuses disposed to encompass a given area in which wireless communications apparatuses are scattered;
    causing a wireless signal to be transmitted and received between the monitoring apparatuses by multi-hop communication among the wireless communications apparatuses;
    calculating an estimated distance between the monitoring apparatuses, based on a hop count of the wireless signal multi-hop communicated among the monitoring apparatuses; and
    making a determination concerning a vacant area in which none of the wireless communications apparatuses is present, based on a result of comparison of the distance indicated by the obtained distance information and the calculated estimated distance.

12. A determining apparatus comprising:
a storage apparatus storing therein information received from wireless communications apparatuses disposed to encompass a given area in which wireless communications apparatuses are scattered; and
a processing apparatus that processes the information stored in the storage apparatus, wherein
the processing apparatus:
   obtains distance information indicating a distance between the monitoring apparatuses,
   causes a wireless signal to be transmitted and received between the monitoring apparatuses by multi-hop communication among the wireless communications apparatuses,
   calculates an estimated distance between the monitoring apparatuses, based on a hop count of the wireless signal multi-hop communicated among the monitoring apparatuses, and
   makes a determination concerning a vacant area in which none of the wireless communications apparatuses is present, based on a result of comparison of the distance indicated by the obtained distance information and the calculated estimated distance.

13. A determining system comprising:
wireless communications apparatuses disposed to encompass a given area in which wireless communications apparatuses are scattered; and
a determining apparatus that includes:
   a storage apparatus storing therein information received from the monitoring apparatuses;
   a processing apparatus that processes the information stored in the storage apparatus, wherein
processing apparatus:
   obtains distance information indicating a distance between the monitoring apparatuses,
   causes a wireless signal to be transmitted and received between the monitoring apparatuses by multi-hop communication among the wireless communications apparatuses,
   calculates an estimated distance between the monitoring apparatuses, based on a hop count of the wireless signal multi-hop communicated among the monitoring apparatuses, and
   makes a determination concerning a vacant area in which none of the wireless communications apparatuses is present, based on a result of comparison of the distance indicated by the obtained distance information and the calculated estimated distance.

14. A determining method executed by a processor, the determining method comprising:
obtaining distance information that indicates a distance between first monitoring apparatuses disposed to encompass a given area in which wireless communications apparatuses are scattered;
causing a wireless signal to be transmitted and received between the first monitoring apparatuses by multi-hop communication among the wireless communications apparatuses;
calculating an estimated distance between the first monitoring apparatuses, based on a hop count of the wireless signal multi-hop communicated among the first monitoring apparatuses; and
making a determination concerning a vacant area in which none of the wireless communications apparatuses is present, based on a result of comparison of the distance indicated by the obtained distance information and the calculated estimated distance;
obtaining for each monitoring apparatus among second monitoring apparatuses disposed to encompass the given area, hop count information that indicates a hop count for a wireless signal that is transmitted from a target wireless communications apparatus included in the wireless communications apparatuses, to be received by the monitoring apparatus by the multi-hop communication among the wireless communications apparatuses;
calculating an estimation line that indicates a candidate of a position of the target wireless communications apparatus, the estimation line being calculated for each monitoring apparatus among the second monitoring apparatuses, and calculated from an estimated distance between the monitoring apparatus and the target wireless communications apparatus, the estimated distance being based on the hop count indicated by the obtained hop count information;
correcting for each monitoring apparatus among the second monitoring apparatuses, the calculated estimation line, based on a determination result concerning the vacant area; and
determining a position of the target wireless communications apparatus, based on intersection of the corrected estimation line.

* * * * *